United States Patent [19]

Komiya et al.

[11] Patent Number: 5,596,067
[45] Date of Patent: Jan. 21, 1997

[54] FREE FALL POLYMERIZATION PROCESS FOR THE PRODUCTION OF POLYCARBONATES

[75] Inventors: Kyosuke Komiya; Yoshifumi Kawakami, both of Kurashiki; Hiroshige Okamoto, Okayama, all of Japan

[73] Assignee: Asahi Kasei Kogyo Kabushiki Kaisha, Osaka, Japan

[21] Appl. No.: 530,274

[22] PCT Filed: Jul. 21, 1994

[86] PCT No.: PCT/JP94/01202

§ 371 Date: Sep. 1, 1995

§ 102(e) Date: Sep. 1, 1995

[87] PCT Pub. No.: WO95/03351

PCT Pub. Date: Feb. 2, 1995

[30] Foreign Application Priority Data

Jul. 23, 1993 [JP] Japan .................................. 5-182896

[51] Int. Cl.$^6$ .................................................. C08G 64/00
[52] U.S. Cl. ..................... 528/196; 159/13.1; 159/13.4; 159/48.2; 159/DIG. 10; 264/211.24; 264/85; 425/72.1; 528/198; 528/199; 526/67
[58] Field of Search ................... 159/13.1, 13.4, 159/48.2, DIG. 10; 264/211.24, 85; 425/72.1; 528/196, 198, 199; 526/67

[56] References Cited

U.S. PATENT DOCUMENTS

| | | | |
|---|---|---|---|
| 2,719,776 | 10/1955 | Kümmel | 18/54 |
| 3,110,547 | 11/1963 | Emmert | 264/211.17 |
| 3,888,826 | 6/1975 | Yamana | 260/47 XA |
| 5,225,526 | 7/1993 | Fukawa et al. | 524/119 |

FOREIGN PATENT DOCUMENTS 53-5718  3/1978  Japan .............................. C08G 63/62

*Primary Examiner*—James J. Seidleck
*Assistant Examiner*—Terressa M. Mosley
*Attorney, Agent, or Firm*—Jacobson, Price, Holman & Stern, PLLC

[57] ABSTRACT

A method for producing an aromatic polycarbonate comprises introducing to an introduction zone (having a perforated plate) a) a molten monomer mixture of an aromatic dihydroxy compound and a diaryl carbonate, or b) a molten prepolymer obtained by a process comprising reacting an aromatic dihydroxy compound with a diaryl carbonate, and allowing the monomer mixture or prepolymer in the molten state to pass downwardly through the perforated plate and fall freely through a free-fall polymerization reaction zone, thereby effecting polymerization of the monomer mixture or prepolymer during the free-fall thereof. Colorless and high quality aromatic polycarbonates are thus stably produced at a high polymerization rate for a prolonged period of time, using an apparatus which has excellent sealing properties under high vacuum and maintenance of which is easy.

11 Claims, 4 Drawing Sheets

FREE FALL POLYMERIZATION PROCESS FOR THE PRODUCTION OF POLYCARBONATES

BACKGROUND OF THE INVENTION

This is a 371 of PCT/JP94/01202 filed Jul. 21, 1994 and published as WO95/03351 Feb. 2, 1995.

1. Field of The Invention

The present invention relates to a method for producing an aromatic polycarbonate.

2. Prior Art

In recent years, aromatic polycarbonates have been widely used in various fields as engineering plastics having excellent heat resistance, impact resistance and transparency. With respect to methods for producing aromatic polycarbonates, various studies have heretofore been made. Of the methods studied, a process utilizing an interfacial polycondensation between an aromatic dihydroxy compound, such as 2,2-bis(4-hydroxyphenyl)propane (hereinafter, frequently referred to as "bisphenol A"), and phosgene has been commercially practiced.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities, such as sodium chloride, and residual methylene chloride, which adversely affect properties of a produced polymer.

With respect to a method for producing an aromatic polycarbonate from an aromatic dihydroxy compound and a diaryl carbonate, in a conventionally known melt polycondensation process a polycarbonate is produced by performing an ester exchange reaction between bisphenol A and diphenyl carbonate in the molten state, while removing a by-produced phenolic compound (phenol). Unlike the interfacial polycondensation process, the melt polycondensation process has an advantage in that a solvent need not be used. However, the melt polycondensation process has a serious problem, namely; since the viscosity of polymer being formed increases during the progress of the polymerization reaction, it becomes difficult to remove by-produced phenol from the polymerization reaction system efficiently, thus making-it difficult to achieve a high degree of polymerization with respect to polycarbonate produced.

Various polymerizers have been known for use in producing aromatic polycarbonates. An agitation type polymerizer vessel equipped with an agitator is widely used. The agitation type polymerizer vessel equipped with an agitator is advantageous in that it exhibits high volumetric efficiency and has a simple construction, so that polymerization on a small scale can be efficiently carried out. However, the agitation type polymerizer vessel has a problem in that, as mentioned above, the by-produced phenol becomes difficult to remove from the polymerization reaction system efficiently in the production of aromatic polycarbonates on a commercial scale, so that it is difficult to achieve a high degree of polymerization with respect to produced polycarbonate.

Specifically, a large-scale agitation type polymerizer vessel generally has a greater ratio of liquid volume to vaporization area than a small-scale one. In other words, the depth of a reaction mixture in the polymerizer is large. In such a case, even if the degree of vacuum of the polymerization reaction zone is raised in order to achieve a high degree of polymerization in the lower part of the agitation vessel, the polymerization proceeds under virtually high pressure due to the weight of the reaction mixture, so that phenol and the like cannot be efficiently removed.

To solve the above-mentioned problem, various attempts have been made to remove phenol and the like from high viscosity polymer being formed. For example, Examined Japanese Patent Application Publication No. 50-19600 discloses a screw type polymerizer having a vent. Examined Japanese Patent Application Publication No. 53-5718 discloses a thin film evaporation type reactor, such as a screw evaporator and a centrifugal film evaporator. Further, Unexamined Japanese Patent Application Laid-Open Specification No. 2-153923 discloses a method in which a combination of a thin film evaporation type apparatus and a horizontal stirring polymerization vessel is used. These polymerizers, including those of an agitation type polymerizer vessel, have a common drawback in that they have a rotary driving part in the main body, which rotary driving part cannot be completely sealed, so that when the polymerization is conducted under high vacuum, a small amount of oxygen inevitably leaks into the reaction system, leading to discoloration of final polymer. When a sealant is used to prevent the leak-in of oxygen into the reaction system, the sealant unavoidably gets mixed into the final polymer, so that the quality of the final polymer is lowered. These polymerizers also have a serious maintenance problem in that, even if the seal effect is high at the beginning of the operation of the polymerizer, the seal effect is inevitably lowered during the continuous operation for a prolonged period of time.

A free-fall polymerization process, in which polymerizing material is allowed to pass downwardly through a perforated plate and fall freely, so that polymerization of the polymerizing material is effected during the free-fall (in this process there is no need of using a polymerizer having a rotary driving part in a main body thereof), is known as a method for producing resins other than aromatic polycarbonates. For example, U.S. Pat. No. 3,110,547 discloses a method for producing a polyester having desired molecular weight, in which polyester having a low degree of polymerization is allowed to fall freely in the form of filaments through a vacuum zone. In the technique of this U.S. Patent, since recirculation of the fallen polymer and repetition of the free fall causes a lowering of the quality of the final polyester, the polymerization is finished upon one-time free-fall without recirculation. However, with respect to such a method, many drawbacks have been pointed out. For example, concerning a method of spinning a polyester having a low degree of polymerization through a spinneret into a vacuum zone to effect polycondensation thereof, Examined Japanese Patent Application Publication No. 48-8355 contains a description such that when polymerizing material (not having a satisfactorily high spinnability) is fed into a reactor, filaments being polymerized are likely to be broken, so that the quality of a polycondensate is drastically lowered. Low molecular weight polycondensate scattering from the filaments sticks to the surface of the spinneret to smudge the spinneret and, hence, it becomes difficult for the filaments to fall straight down through the spinneret, so that the filaments are caused to contact each other to bring about breakage of the filaments or are caused to join one another, thus hindering the polymerization reaction. Further, observation windows easily get clouded and, hence, observation becomes difficult, so that an observer has difficulty in ascertaining an appropriate time for replacement of smudged spinnerets with fresh ones. In the above Japanese patent document, it is further described that, for the above reasons, when producing a polyester and a polyamide, it is preferred to employ a non-free-fall process in which a polymer having a low degree of polymerization is allowed to flow down along and in contact with a porous material arranged vertically in a reaction vessel. However, the above Japanese patent document contains no description about aromatic polycarbonates.

Aside from a polymerization method, with respect to a method for removing a residual monomer from polymerization products, U.S. Pat. No. 2,719,776 proposes a process of spinning a lactam polymerization product, which comprises allowing the product to pass through a perforated plate and fall freely in the form of filaments, whereby the residual monomer is removed by evaporation. However, many disadvantages accompanying this method have been pointed out. For example, Unexamined Japanese Patent Application Laid-Open Specification No. 53-17569 points out that the method of U.S. Pat. No. 2,719,776 has various disadvantages. That is, in the method of the above-mentioned U.S. Patent, when the evaporation of the volatiles is small, filaments can be formed, whereas when the evaporation of the volatiles is large, filaments unfavorably suffer foaming, making it difficult to carry out the monomer-removing operation smoothly. Further, this method can be applied only to a polymerization product having a viscosity in a relatively narrow range suitable for forming filaments. Moreover, in this method, when an inert gas is introduced into a column in which this method is practiced, filaments are caused to contact and join one another due to the turbulence of the flow of inert gas. To solve such disadvantages, Unexamined Japanese Patent Application Laid-Open Specification No. 53-17569 proposes a non-free-fall process which comprises providing a linear support arranged vertically, and allowing a high viscosity material to fall along and in contact with the linear support. This Japanese patent document proposes this non-free-fall process as a method for producing polyesters, such as polyethylene terephthalate and polybutylene terephthalate, and polyamides, such as nylon 6 and nylon 66. However, in this Japanese patent document, there is no mention of aromatic polycarbonates.

Examined Japanese Patent Application Publication No. 4-14127 has a description to the effect that, as a continuous polycondensation process for producing a polyester, there have been known two types of free-fall polycondensation processes, namely: a spinning process in which a polymerizing material is spun through a spinneret and a process in which a polymerizing material is extruded in the form of a film through a slit to effect polymerization thereof, and that, however, both processes have difficulties in obtaining a polymer having a satisfactorily high molecular weight. This Japanese patent document proposes a non-free-fall method in which a polymerizing material is allowed to pass through a slit-shaped feed port, and the resultant film is supported between at least two wires which are vertically and separately arranged and allowed to move downwardly between the wires, thereby effecting polycondensation of the polymerizing material. In this Japanese patent document, no mention is made of aromatic polycarbonates.

As described above, a free-fall polymerization process, in which polymerizing material is allowed to pass through a perforated plate and fall freely, is known as a method for producing polyesters and polyamides, but such a process is not known at all as a method for producing aromatic polycarbonates. Further, many drawbacks have been pointed out with respect to the free-fall polymerization processes for producing polyesters and polyamides. Therefore, various types of non-free-fall polymerization processes have been proposed for producing polyesters and polyamides.

It is a primary object of the present invention to provide a melt polycondensation process for producing a colorless and high quality aromatic polycarbonate at a high polymerization rate and stably for a prolonged period of time, using apparatus which is excellently sealed under high vacuum conditions, and easy to maintain.

SUMMARY OF THE INVENTION

The present inventors have made extensive and intensive studies with a view toward solving the above-mentioned problems of the prior art. As a result, it has unexpectedly been found that by adopting a free-fall polymerization method in which a polymerizing material is allowed to pass through a perforated plate and fall freely, the object of the present invention can be attained.

The essential features and preferred embodiments of the present invention are enumerated below.

(1) A method for producing an aromatic polycarbonate, which comprises a) introducing to an introduction zone (having a perforated plate) a molten monomer mixture of an aromatic dihydroxy compound and a diaryl carbonate, or a molten prepolymer obtained by a process comprising reacting an aromatic dihydroxy compound with a diaryl carbonate, and b) allowing the monomer mixture or prepolymer in the molten state to pass downwardly through the perforated plate and fall freely through a free-fall polymerization reaction zone, thereby effecting polymerization of the monomer mixture or prepolymer during the free-fall thereof.

(2) A method for producing an aromatic polycarbonate, which comprises a) introducing to an introduction zone (having a perforated plate) a molten monomer mixture of an aromatic dihydroxy compound and a diaryl carbonate, or a molten prepolymer obtained by a process comprising reacting an aromatic dihydroxy compound with a diaryl carbonate, b) allowing the monomer mixture or prepolymer in the molten state to pass downwardly through the perforated plate and fall freely through a free-fall polymerization reaction zone, thereby effecting polymerization of the monomer mixture or prepolymer during the free-fall thereof to obtain a polymer at the bottom of the polymerization reaction zone, c) recirculating a part or all of the polymer to the introduction zone (having the perforated plate), and d) allowing the recirculated polymer to pass downwardly through the perforated plate and fall freely through the free-fall polymerization reaction zone, thereby increasing the degree of polymerization of the recirculated polymer during the free-fall thereof.

(3) A method for producing an aromatic polycarbonate, which comprises a) continuously introducing to an introduction zone (having a perforated plate) a molten monomer mixture of an aromatic dihydroxy compound and a diaryl carbonate, or a molten prepolymer obtained by a process comprising reacting an aromatic dihydroxy compound with a diaryl carbonate, and b) allowing the monomer mixture or prepolymer in the molten state to pass downwardly through the perforated plate and fall freely through a free-fall polymerization reaction zone, thereby effecting polymerization of the monomer mixture or prepolymer during the free-fall thereof to obtain a polymer at the bottom of the free-fall polymerization reaction zone, and wherein the method further comprises continuously conducting a sequence of c)

steps of recirculating to the introduction zone (having the perforated plate) a part of the polymer obtained at the bottom of the free-fall polymerization reaction zone, and d) allowing an admixture of the continuously introduced monomer mixture or prepolymer in the molten state and the recirculated polymer to pass downwardly through the perforated plate and fall freely through the free-fall polymerization reaction zone, thereby continuously effecting a free-fall polymerization of the admixture during the free-fall thereof, while continuously withdrawing the remainder of the polymer obtained at the bottom of the free-fall polymerization reaction zone.

(4) A method for producing an aromatic polycarbonate, which comprises a) polymerizing a starting material in molten state, while agitating, in an agitation type polymerizer vessel, the starting material being a monomer mixture of an aromatic dihydroxy compound and a diaryl carbonate or a first prepolymer obtained by reacting an aromatic dihydroxy compound with a diaryl carbonate, thereby effecting an agitation polymerization of the starting material to obtain a second prepolymer, b) introducing the second prepolymer in molten state to an introduction zone (having a perforated plate), and c) allowing the molten second prepolymer to pass downwardly through the perforated plate and fall freely through a free-fall polymerization reaction zone, thereby effecting a free-fall polymerization of the second prepolymer to increase the degree of polymerization of the second prepolymer during the free-fall thereof to obtain a polymer at a bottom of the polymerization reaction zone.

(5) A method according to item (4) above, which further comprises d) recirculating to the introduction zone a part or all of the polymer obtained by the free-fall polymerization at the bottom of the free-fall polymerization reaction zone, and e) allowing the recirculated polymer to pass downwardly through the perforated plate and fall freely through the free-fall polymerization reaction zone, thereby increasing the degree of polymerization of the recirculated polymer during the free-fall thereof.

(6) A method according to item (4) above, wherein, in the free-fall polymerization of the second prepolymer, the second prepolymer is continuously introduced to the introduction zone (having the perforated plate), and which method further comprises continuously conducting a sequence of steps of recirculating to the introduction zone a part of the polymer obtained by the free-fall polymerization at the bottom of the free-fall polymerization reaction zone, and allowing an admixture of the continuously introduced second prepolymer in the molten state and the recirculated polymer to pass downwardly through the perforated plate and fall freely through the free-fall polymerization reaction zone, thereby continuously effecting a free-fall polymerization of the admixture during the free-fall thereof, while continuously withdrawing the remainder of the polymer obtained at the bottom of the free-fall polymerization reaction zone.

(7) A method for producing an aromatic polycarbonate, which comprises a) polymerizing a starting material in a molten state, while agitating, in an agitation type polymerizer vessel, the starting material being a monomer mixture of an aromatic dihydroxy compound and a diaryl carbonate or a first prepolymer obtained by reacting an aromatic dihydroxy compound with a diaryl carbonate, thereby effecting agitation polymerization of the starting material to obtain a second prepolymer; b) feeding the second prepolymer in molten state to an upper portion of a wall extending through a wall-wetting fall polymerization reaction zone, and allowing the second prepolymer to fall along and in contact with the surface of the wall, thereby effecting a wall-wetting fall polymerization of the second prepolymer during the wall-wetting fall thereof to obtain a third prepolymer at a bottom of the wall-wetting fall polymerization reaction zone; and c) introducing the third prepolymer in molten state to an introduction zone (having a perforated plate), and d) allowing the molten third prepolymer to pass downwardly through the perforated plate and fall freely through a free-fall polymerization reaction zone, thereby effecting a free-fall polymerization of the third prepolymer to increase the degree of polymerization of the third prepolymer during the free-fall thereof to obtain a polymer at a bottom of the free-fall polymerization reaction zone.

(8) A method according to item (7) above, which further comprises e) recirculating to the introduction zone a part or all of the polymer obtained by the free-fall polymerization at the bottom of the free-fall polymerization reaction zone, and f) allowing the recirculated polymer to pass downwardly through the perforated plate and fall freely through the free-fall polymerization reaction zone, thereby increasing the degree of polymerization of the recirculated polymer during the free-fall thereof.

(9) A method according to item (7) above, wherein, in the free-fall polymerization of the third prepolymer, the third prepolymer is continuously introduced to the introduction zone having the perforated plate, and which method further comprises continuously conducting a sequence of e) steps of recirculating to the introduction zone a part of the polymer obtained by the free-fall polymerization at the bottom of the free-fall polymerization reaction zone, and f) allowing an admixture of the continuously introduced third prepolymer in the molten state and the recirculated polymer to pass downwardly through the perforated plate and fall freely through the free-fall polymerization reaction zone, thereby continuously effecting a free-fall polymerization of the admixture during the free-fall thereof, while continuously withdrawing the remainder of the polymer obtained at the bottom of the free-fall polymerization reaction zone.

(10) A method according to any one of items (1) to (9) above, wherein the free-fall is conducted through a distance of 0.3 m or more from the perforated plate.

As mentioned above, a number of polymerizers having no rotary driving parts in their respective main bodies are known for use in producing resins other than polycarbonates. In this connection, it should be noted that there is a large difference between the melt polycondensation reaction for producing aromatic polycarbonates and that for producing polyesters and polyamides, so that it is difficult to apply a polymerizer designed for use in producing polyesters and polyamides to the production of aromatic polycarbonates. The major differences between aromatic polycarbonates and both polyesters and polyamides are as follows: First, the melt viscosity, which is an important factor in designing a polymerizer for melt polycondensation of aromatic polycarbonates, is extremely high as compared to that of polyesters and polyamides. Specifically, at the temperatures of polymerization, the melt viscosity of both polyamides and polyesters at a later stage of polymerization is usually from several hundred to several thousand poises and is unlikely to rise to a level of 3000 poises or more, whereas the melt viscosity of aromatic polycarbonates at a later stage of polymerization reaches a level as high as tens of thousands of poises. Second, the melt polycondensations of polyamides, polyesters and aromatic polycarbonates are all equilibrium reactions, but the reactions for these polymers are largely different in equilibrium constant. Generally, the equilibrium constant of the reaction for polyamides is on the order of $10^2$ and that for polyesters is approximately 1, whereas the equilibrium constant of the reaction for aromatic polycarbonates is very small and on the order of $10^{-1}$. The smaller the equilibrium constant, the more difficult the polymerization reaction, so that the reaction does not proceed unless by-products are more efficiently removed from the reaction system. Therefore, in the polymerization of aromatic polycarbonates, the by-products must be removed from the reaction system far more efficiently than in the polymerization of polyamides and polyesters. However, efficient removal of by-products is very difficult in the production of aromatic polycarbonates since aromatic polycarbonates have a very high melt viscosity, as mentioned above.

However, it has surprisingly been found that when a free-fall polymerization technique is applied to production of aromatic polycarbonates, high quality aromatic polycarbonates can be produced with great advantages, without causing the above-mentioned problems accompanying the operation of free-fall polymerization of polyamides and polyesters. In other words, by the present invention, high quality aromatic polycarbonates can be stably produced since filaments falling freely do not suffer breakage during the free-fall, and the quality of the resultant polymer becomes uniform. Namely, since no accumulation of low molecular weight polycondensate occurs on a spinneret, the filaments can be injected straight down without hindrance, and there is no need to halt the operation to replace smudged spinnerets with fresh ones. Therefore, the operation can be stably carried out for a very long period of time.

The reason for such a difference in behavior between the free-fall polymerization of aromatic polycarbonates and the free-fall polymerization of polyesters and polyamides has not yet been elucidated. With respect to the reason why spinnerets do not at all suffer from accumulation of a low molecular weight polycondensate, it is presumed that by-produced phenol effectively washes away the low molecular weight polycondensate accumulated on the spinneret during the polymerization of aromatic polycarbonates, fundamentally differing from the polymerization of polyamides or polyesters wherein by-products are water and ethylene glycol. Such an advantageous effect of the by-produced phenol on the free-fall polymerization of aromatic polycarbonates could not be expected from the polymerization of polyesters and polyamides at all.

Further, it has become clear that aromatic polycarbonates can be produced more easily by a free-fall polymerization process than by a non-free-fall polymerization, such as polymerization by allowing a polymerizing material to fall along and in contact with a guide. This is also surprising because, according to conventional knowledge regarding a method for producing polyesters and polyamides, it has been recognized that a non-free-fall process is superior to a free-fall process. This fact clearly shows that knowledge about the polymerization reaction of polyesters and polyamides cannot be applied to the polymerization of aromatic polycarbonates.

The free-fall polymerization method of the present invention using a perforated plate does not require a polymerizer which has a rotary driving part which is exposed to a gaseous phase during the reaction, so that, with respect to polymerization apparatus for practicing a free-fall polymerization method, excellent sealing can be provided even under high vacuum, and maintenance of the apparatus is easy. Furthermore, colorless, transparent and high quality aromatic polycarbonate can be easily produced by the method of the present invention. That is, the method of the present invention for producing an aromatic polycarbonate solves all of the difficult problems mentioned above which accompany conventional methods for melt polycondensation of an aromatic polycarbonate.

In the method of the present invention, various modes are possible. Examples of modes include a) the use of a single free-fall polymerizer which is adapted for allowing a polymerizing material to pass through a perforated plate and fall freely, b) the use of a plurality of free-fall polymerizers, each of which is adapted for allowing a polymerizing material to pass through a perforated plate and fall freely, and c) the use of a combination of a single or plurality of free-fall polymerizers adapted for allowing a polymerizing material to pass through a perforated plate and fall freely and another type or types of polymerizers.

Preferred examples of embodiments of the mode which comprises combining a free-fall polymerization process using a perforated plate and another type or types of polymerization processes include a method which comprises conducting an agitation polymerization of starting material (selected from the group consisting of a) a monomer mixture of an aromatic dihydroxy compound and a diaryl carbonate and b) a first prepolymer obtained by reacting an aromatic dihydroxy compound with a diaryl carbonate) using an agitation type polymerizer vessel to obtain a second prepolymer and conducting a free-fall polymerization of the second prepolymer using a free-fall polymerizer having a perforated plate. By this method, high quality aromatic polycarbonate can be efficiently produced. In the agitation polymerization, it is ordinarily not necessary to carry out the reaction under high vacuum, so that the quality of the resultant second prepolymer is not lowered by the agitation type polymerizer vessel, and the starting material can be polymerized at high volumetric efficiency. In the subsequent step for increasing the degree of polymerization of the second prepolymer, a free-fall polymerization is particularly advantageous. By using the above method, in which an agitation polymerization is combined with a free-fall polymerization, high quality aromatic polycarbonate can be efficiently produced.

Further, as another preferred embodiment of the combination mode of the method of the present invention, there can be mentioned a method which comprises conducting an agitation polymerization of the above-mentioned starting material using an agitation type polymerizer vessel to obtain a second prepolymer, conducting a wall-wetting fall polymerization of the second prepolymer by allowing the second prepolymer to fall along and in contact with the surface of a wall, to obtain a third prepolymer thereby, and conducting a free-fall polymerization of the third prepolymer using a free-fall polymerizer having a perforated plate. In the agitation polymerization, it is ordinarily not necessary to carry out the reaction under high vacuum, so that the quality of the resultant second prepolymer is not lowered by the agitation type polymerizer vessel, and the starting material can be polymerized at high volumetric efficiency, as mentioned above. The wall-wetting fall polymerization of the second prepolymer having a relatively low degree of polymerization is advantageous since a large heat-transfer surface area is available in the wall-wetting fall polymerization method, and it can efficiently provide latent heat of evaporation for a by-produced aromatic monohydroxy compound and the like. In the subsequent step for further increasing the degree of polymerization of the third prepolymer, a free-fall polymerization is particularly advantageous. By combining these three different polymerization processes in the manner mentioned above, a high quality aromatic polycarbonate can be efficiently produced.

Hereinbelow, the present invention will be described in more detail.

In the present invention, the terminology "aromatic dihydroxy compound" means a compound represented by the following formula:

HO—Ar—OH wherein Ar represents a divalent aromatic group.

Preferred examples of divalent aromatic groups as Ar include a group represented by the following formula:

—Ar$^1$—Y—Ar$^2$— wherein each of Ar$^1$ and Ar$^2$ independently represents a divalent carbocyclic or heterocyclic aromatic group having from 5 to 70 carbon atoms, and Y represents a divalent alkane group having from 1 to 30 carbon atoms.

In divalent aromatic groups as Ar$^1$ and Ar$^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Illustrative examples of heterocyclic aromatic groups include an aromatic group having at least one hetero atom, such as a nitrogen atom, an oxygen atom or a sulfur atom.

Examples of divalent aromatic groups as Ar$^1$ and Ar$^2$ include an unsubstituted or substituted phenylene group, an unsubstituted or substituted biphenylene group and an unsubstituted or substituted pyridylene group. Substituents for Ar$^1$ and Ar$^2$ are as described above.

Examples of divalent alkane groups as Y include organic groups respectively represented by the following formulae:

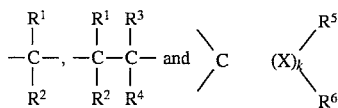

wherein each of R$^1$, R$^2$, R$^3$ and R$^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has R$^5$ and R$^6$ bonded thereto; each R$^5$ independently represents a hydrogen atom or an alkyl group having from 1 to 6 carbon atoms, and each R$^6$ independently represents a hydrogen atom or an alkyl group having from 1 to 6 carbon atoms, wherein R$^5$ and R$^6$ are the same or different;

wherein at least one hydrogen atom of each of R$^1$, R$^2$, R$^3$, R$^4$, R$^5$ and R$^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Specific examples of divalent aromatic groups as Ar include groups respectively represented by the following formulae:

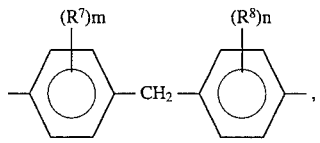

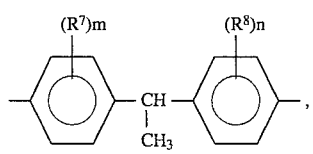

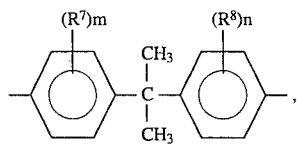

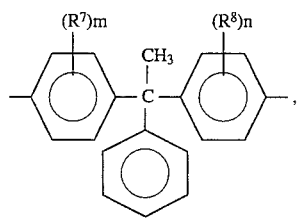

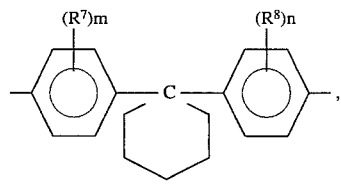

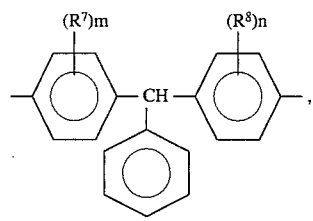

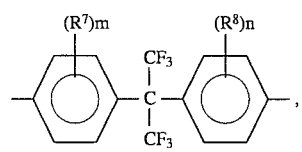

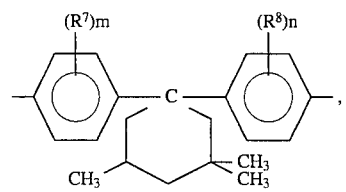

-continued

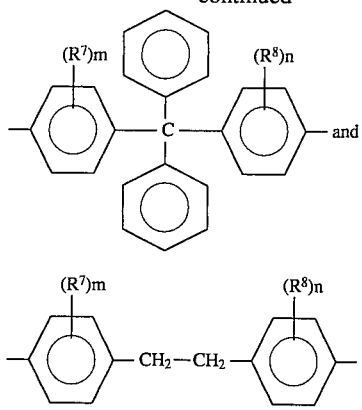

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, $R^7$'s are the same or different, and when n is an integer of from 2 to 4, $R^8$'s are the same or different.

Further, examples of divalent aromatic groups as Ar also include those which are represented by the following formula:

—Ar$^1$—Z—Ar$^2$— wherein $Ar^1$ and $Ar^2$ are as defined above; and Z represents a single bond or a divalent group, such as —O—, —CO—, —S—, —SO$_2$, —SO—, —COO—, or —CON(R$^1$)—, wherein $R^1$ is as defined above.

Examples of such divalent aromatic groups as Ar include groups respectively represented by the following formulae:

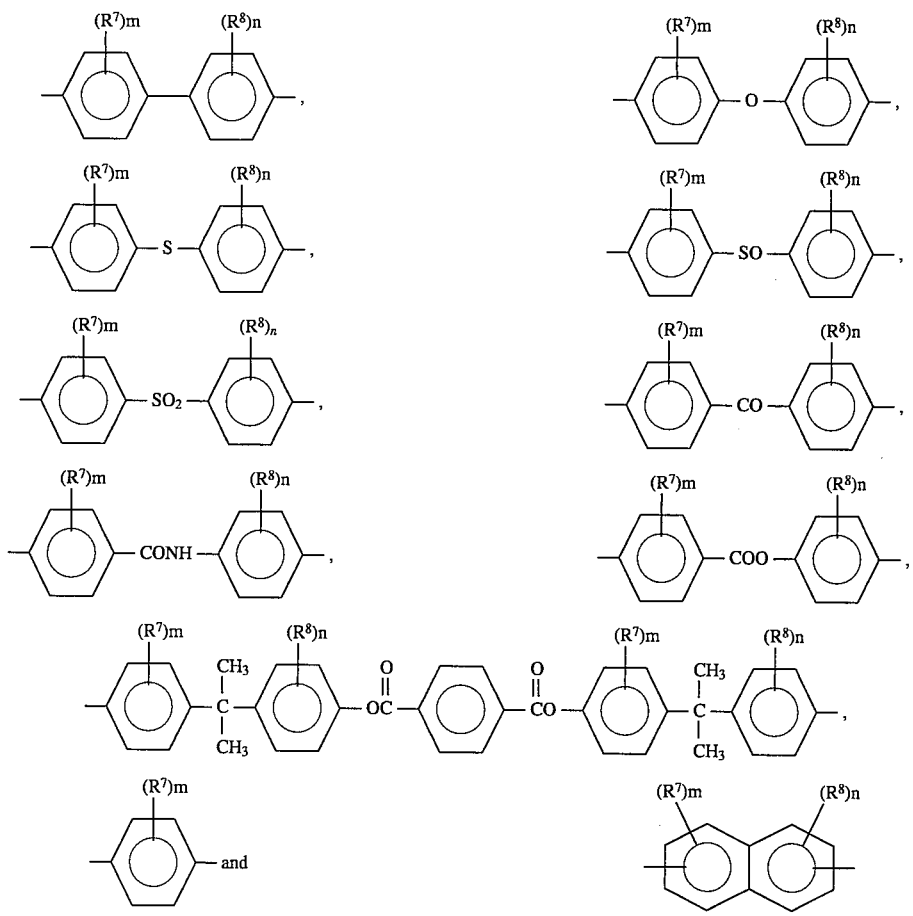

wherein $R^7$, $R^8$, m and n are as defined above.

In the method of the present invention, the aromatic dihydroxy compounds can be used individually or in combination. Representative examples of aromatic dihydroxy compounds include bisphenol A.

The diaryl carbonate used in the present invention is represented by the following formula:

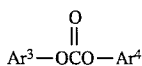

wherein each of $Ar^3$ and $Ar^4$ independently represents a monovalent aromatic group.

Each of $Ar^3$ and $Ar^4$ independently represents a monovalent carbocyclic or heterocyclic aromatic group. At least one hydrogen atom of each of $Ar^3$ and $Ar^4$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group.

Preferred examples of monovalent aromatic groups as $Ar^3$ and $Ar^4$ are those respectively represented by the following formulae:

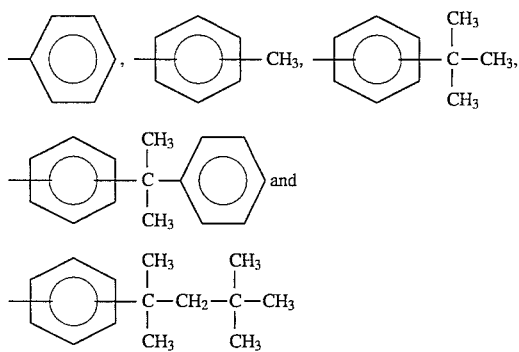

Representative examples of diaryl carbonates include a substituted or unsubstituted diphenyl carbonate compound represented by the following formula:

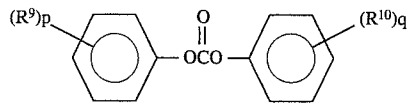

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, $R^9$'s are the same or different, and when q is an integer of 2 or more, $R^{10}$'s are the same or different.

Of these diphenyl carbonate compounds, preferred are diaryl carbonates having a symmetrical configuration, such as (unsubstituted) diphenyl carbonate, ditolyl carbonate, and a diphenyl carbonate substituted with a lower alkyl group, e.g., di-t-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e. a charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of the aromatic polycarbonate obtained according to the method of the present invention is generally from 500 to 100,000, preferably from 500 to 30,000.

In the present invention, the term "molten monomer mixture of an aromatic dihydroxy compound and a diaryl carbonate" means a homogeneous mixture of the monomers which is obtained by mixing the aromatic dihydroxy compound and the diaryl carbonate while heating. The molten monomer mixture can be obtained by mixing the aromatic dihydroxy compound and the diaryl carbonate while heating at a temperature in the range of from 150° C. to 200° C. In the present invention, the term "molten prepolymer" means a polycondensate, which is obtained by a process comprising reacting an aromatic dihydroxy compound with a diaryl carbonate, and has a lower molecular weight than a final aromatic polycarbonate to be produced by the method of the present invention. The range of the molecular weight of the molten prepolymer to be used in the present invention varies depending on the molecular weight of a final aromatic polycarbonate to be produced. For example, when it is intended to obtain an aromatic polycarbonate having a number average molecular weight of 10,000, the number average molecular weight range of the molten prepolymer is less than 10,000; and when it is intended to obtain an aromatic polycarbonate having a number average molecular weight of 20,000, the number average molecular weight range of the molten prepolymer is less than 20,000.

In the method of the present invention, a polymerizing material [which is at least one member selected from the group consisting of a) a molten monomer mixture of an aromatic dihydroxy compound and a diaryl carbonate, and b) a molten prepolymer obtained by a process comprising reacting an aromatic dihydroxy compound with a diaryl carbonate] is allowed to pass downwardly through a perforated plate and fall freely through a free-fall polymerization reaction zone, thereby effecting polymerization of the polymerizing material during the free-fall thereof.

The terminology "free-fall" used in the present invention means a fall under vacuum or non-vacuum conditions, during which a falling polymerizing material does not contact an object causing resistance to fall, such as a guide or a wall. The polymerizing material is allowed to fall freely in the form of a film, a filament, a droplet, a spray or the like. During the free-fall, by-products produced in a polycondensation reaction, such as phenol, are removed.

There is no particular limitation with respect to the shape of holes of the perforated plate to be used in the method of the present invention. Generally, the morphology of a hole is selected from a circle, an ellipse, a triangle, a slit, a polygon, a star and the like. The area of each hole of the perforated plate is usually from 0.01 to 100 cm² preferably from 0.05 to 10 cm², more preferably from 0.1 to 5 cm². The perforated plate may have a nozzle connected thereto, as long as a polymerizing material can fall freely after passing such a nozzle. The distance between adjacent holes is generally from 1 to 500 mm, preferably from 10 to 100 mm, more preferably from 15 to 50 mm, as measured between the centers of the adjacent holes.

With respect to the number of holes in the perforated plate, there is no particular limitation, but the number of holes may vary depending on conditions, such as the reaction temperature and pressure, the amount of catalyst, and the range of molecular weight of polycarbonate to be produced. For example, when a polymer is to be produced at a rate of 100 kg/hr, usually 10 to $10^5$ holes are necessary. A distance through which the free-fall of the polymerizing material is conducted is preferably from 0.3 to 50 m, more preferably from 0.5 to 20 m, from the perforated plate.

A flow rate at which the polymerizing material passes through the holes of the perforated plate may vary depending on the molecular weight of the polymerizing material. The flow rate per hole is generally from $10^{-4}$ to $10^4$ liters/hr, preferably from $10^{-2}$ to $10^2$ liters/hr, more preferably from 0.1 to 50 liters/hr.

The free-fall time is not particularly limited, but is generally from 0.01 seconds to 1 hour.

In the present invention, a polymer obtained by the free-fall polymerization can be withdrawn, as such, from the polymerizer, but it is preferred that the polymer be recirculated to the introduction zone having the perforated plate for further free-fall polymerization. In this case, residence time of polymer in a reservoir portion at the bottom of the free-fall polymerization reaction zone or in a recirculation line can be prolonged according to the time necessary for polycondensation reaction. When the obtained polymer is recirculated and subjected to further free-fall polymerization, a renewed liquid surface area formed per unit time becomes large, so that a desired molecular weight can be easily achieved.

Preferred examples of embodiments of the method of the present invention include a method according to the embodiment of item (1) above, wherein the introduction of the molten monomer mixture or molten prepolymer (polymerizing material) to the introduction zone having the perforated plate is continuously conducted, and which method further comprises continuously conducting a sequence of steps of recirculating to the introduction zone (having the perforated plate) part of the polymer obtained at the bottom of the free-fall polymerization reaction zone, and allowing an admixture of the continuously introduced monomer mixture or prepolymer in the molten state and the recirculated polymer to pass downwardly through the perforated plate and fall freely through the free-fall polymerization reaction zone, thereby continuously effecting a free-fall polymerization of the admixture during the free-fall thereof, while continuously withdrawing the remainder of the polymer obtained at the bottom of the free-fall polymerization reaction zone. According to this embodiment, polymerization can be carried out stably for a prolonged period of time without an accumulation of low molecular weight polycondensate and the like on a perforated plate. This is one of the great advantages of the present invention. In the present invention, the reaction temperature for reacting the aromatic dihydroxy compound with the diaryl carbonate is generally in the range of from 50° to 350° C., preferably from 100° to 290° C.

As the reaction proceeds, an aromatic monohydroxy compound is by-produced. By removing the aromatic monohydroxy compound from the reaction system, the reaction rate can be increased. Therefore, in the method of the present invention, it is preferable to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The above two methods can be used individually or in combination. The preferred reaction pressure may vary depending on the molecular weight of the molten monomer mixture or molten prepolymer. When the number average molecular weight of the molten monomer mixture or molten prepolymer is less than 1,000, the reaction pressure is preferably from 50 mmHg to atmospheric pressure. When the number average molecular weight is from 1,000 to 2,000, the reaction pressure is preferably from 3 to 80 mmHg. When the number average molecular weight is greater than 2,000, the reaction pressure is preferably 10 mmHg or less, more preferably 5 mmHg or less.

It is particularly preferred that the polymerization be carried out under reduced pressure while introducing an inert gas as mentioned above. By this method, a high degree of polymerization can efficiently be achieved without causing problems, such as mutual contact of adjacent filaments due to turbulence of gas flow.

A melt polycondensation reaction can be carried out in the absence of a catalyst. However, if it is desired to accelerate the polymerization, the polymerization can be effectd in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and of aluminum hydride, such as lithium aluminum hydride, sodium boron hydride and tetramethyl ammonium boron hydride; hydrides of an alkali and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO-Ar-OLi wherein Ar represents an aryl group, and NaO-Ar-ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1, R^2, R^3, R^4)$, and phosphonium borates represented by the formula: $(R^1 R^2 R^3 R^4)PB(R^1 R^2 R^3 R^4)$, wherein $R^1$, $R^2$, $R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts to be used is generally in the range of from $10^{-8}$ to 1% by weight, preferably from $10^{-7}$ to $10^{-1}$% by weight, based on the weight of the aromatic dihydroxy compound.

Preferred modes of the method of the present invention in which a free-fall polymerizer is used are explained hereinbelow, referring to the accompanying drawings.

FIGS. 1 and 2 show two forms of polymerization apparatus (each containing a free-fall polymerizer) usable for carrying out the method of the present invention. When the polymerization apparatus of FIG. 1 is used, a polymerizing material [which is at least one material selected from the group consisting of a) a molten monomer mixture of an aromatic dihydroxy compound and a diaryl carbonate, and b) a molten prepolymer obtained by reacting an aromatic dihydroxy compound with a diaryl carbonate] is fed through inlet 1 and introduced to an introduction zone having perforated plate 3, and allowed to pass through perforated plate 3 and fall freely through a free-fall polymerization reaction zone in polymerizer 10. Polymerizing material 4 falls freely in the form of a film, a filament, a droplet or a spray. The internal pressure of free-fall polymerizer 10 is controlled to a predetermined value. An aromatic monohydroxy compound and the like evaporated from the polymerization reaction system and an inert gas, such as nitrogen, which is optionally fed from gas feed port 5, are discharged through vent 6. The resultant polymer obtained at the bottom of the free-fall polymerization reaction zone is withdrawn through outlet 9 by means of discharge pump 8. The main body of free-fall polymerizer 10 and the like are heated to and kept at an elevated temperature by means of a heater and a jacket.

When a polymerization apparatus of FIG. 2 is used, a polymerizing material (which is as defined above) is fed through inlet 1 and recirculation line 2 and introduced to an introduction zone having perforated plate 3, and allowed to pass through perforated plate 3 and fall freely through a free-fall polymerization reaction zone in polymerizer 10. Polymerizing material 4 falls freely in the form of a film, a filament, a droplet or a spray. The internal pressure of free-fall polymerizer 10 is maintained at a predetermined level. A by-produced and evaporated aromatic monohydroxy compound and the like, and an inert gas, such as nitrogen, which is optionally fed from gas feed port 5, are discharged through vent 6. The resultant polymer obtained at the bottom of the free-fall polymerization reaction zone is recirculated through recirculation line 2 (having recirculation pump 7) to the introduction zone having perforated plate 3, and allowed to pass through perforated plate 3 and fall freely through the free-fall polymerization reaction zone in polymerizer 10, thereby increasing the degree of polymerization of the recirculated polymer during the free-fall thereof. After the degree of polymerization has reached a predetermined level, the polymer is withdrawn through outlet 9 by means of discharge pump 8. The main body of free-fall polymerizer 10, recirculation line 2 and the like are heated to and kept at an elevated temperature by means of a heater and a jacket.

When free-fall-polymerizer 10 of FIG. 2 is used for batchwise polymerization, all of the polymerizing material selected from the molten monomer mixture and the molten prepolymer is fed through inlet 1 at the start of the operation at a time, and polymerization is carried out in a closed system while recirculating until a polymer having a predetermined degree of polymerization is obtained. The obtained polymer is withdrawn through outlet 9. When free-fall polymerizer 10 of FIG. 2 is used for continuous polymerization, the polymerizing material is continuously introduced through inlet 1 to conduct free-fall polymerization, while the resultant polymer (having a predetermined molecular weight) is continuously withdrawn through outlet 9 at a controlled rate such that a predetermined amount of molten polycondensate mixture is present in the polymerizer. A polymerizer to be used in the present invention may be equipped with an agitator at the bottom, but such an agitator is not essential. Therefore, it is possible to employ a free-fall polymerizer which does not have a rotary driving part in a main body thereof and hence it is possible to carry out polymerization under tightly sealed conditions even under high vacuum. The recirculation pump in the recirculation line has a rotary driving part, but the rotary driving part of the recirculation pump in the recirculation line is highly sealed, thus differing from a rotary driving part as provided in the main body of a polymerizer, because the recirculation pump is submerged below a liquid head of molten condensate mixture accumulated at the bottom of the main body. The height of the liquid head is 0.3 m or more, preferably 0.5 m or more.

The method of the present invention can be practiced using a single polymerizer, but, if desired, two or more polymerizers can be used. Moreover, the interior of a single polymerizer may be partitioned vertically or horizontally into a plurality of compartments so that the compartments can be used as multiple polymerizers.

In the present invention, it is possible to carry out the entire process of polymerizing a molten monomer mixture of an aromatic dihydroxy compound and a diaryl carbonate for obtaining a final aromatic polycarbonate having a predetermined molecular weight by only a free-fall polymerization using a perforated plate. But it is also possible to combine the free-fall polymerization with other polymerization methods.

Preferred embodiments of combinations of the free-fall polymerization process of the present invention with another polymerization method or other methods are explained below, but these embodiments should not be construed as limiting the scope of the present invention. For example, an aromatic polycarbonate can be produced by using a combination of a free-fall polymerization process with a polymerization process using a film type polymerizer, a screw type polymerizer, a horizontal stirring polymerizer, or the like.

(1) Combination of an agitation polymerization and a free-fall polymerization using a perforated plate Preferred examples of combinations of the free-fall polymerization process of the present invention with another polymerization method or other methods include a combination of an agitation polymerization and the free-fall polymerization. In general, agitation type polymerizer vessels have a high volumetric efficiency and a high agitation efficiency for low viscosity material. However, in agitation type polymerizer vessels, liquid has a small liquid surface area relative to the liquid volume and does not exhibit a high agitation efficiency for a high viscosity material. Therefore, when an aromatic polycarbonate is produced using only an agitation type polymerizer vessel, the more the polymerization reaction progresses, the higher the viscosity of the reaction mixture becomes. As a result, it becomes increasingly difficult to remove an aromatic monohydroxy compound from the reaction mixture and advance the polymerization reaction. Further, since the agitation type polymerizer vessel has a rotary driving part in a gaseous phase portion thereof, oxygen leaks into the polymerizer when the polymerization is conducted under high vacuum, causing a lowering of the quality of a final polymer. However, by combining an agitation polymerization (using an agitation type polymerizer vessel) with free-fall polymerization (using a perforated plate), a high quality aromatic polycarbonate can be produced efficiently. The reason for this is as follows. In the early stage of the polymerization, the reaction need not be carried out under high vacuum, so that the early stage polymerization reaction can be satisfactorily carried out by means of an agitation type polymerizer vessel with high agitation efficiency (due to a low viscosity of the reaction mixture) and high volumetric efficiency, without suffering from reducing the quality of final polymer. On the other hand, when the later stage polymerization reaction is carried out by means of the free-fall polymerizer having a perforated plate, the aromatic monohydroxy compound can be efficiently removed so that the reaction is advanced. Further, since a polymerizer to be used in the free-fall polymerization has excellent sealing properties under high vacuum, high quality aromatic polycarbonate can easily be produced.

In the present invention, the agitation polymerization is advantageously used for producing a second prepolymer having a number average molecular weight of from 300 to 5,000 from a) a molten monomer mixture of an aromatic dihydroxy compound and a diaryl carbonate or b) a first prepolymer obtained by reacting an aromatic dihydroxy compound with a diaryl carbonate. When the agitation polymerization is followed by free-fall polymerization, the free-fall polymerization is intended to increase the degree of polymerization of the second prepolymer obtained in the agitation polymerization, thereby obtaining an aromatic polycarbonate having a higher degree of polymerization than that of the second prepolymer.

As the agitation vessel of the agitation type polymerizer vessel, any of the agitation vessels described, for example, in Chapter 11 of "Kagaku Sohchi Binran (*Handbook of Chemical Apparatus*)" edited by "Kagaku Kogyo Kyokai (the Society of Chemical Engineers, Japan)", (1989) can be used. The morphology of the agitation vessel is not particularly limited. Generally, a vertical or a horizontal cylinder type vessel can be used. The shape of the agitating blade is also not particularly limited. Agitating blades of anchor type, turbine type, screw type, ribbon type, double blade type and the like can be used.

In the agitation polymerization, the reaction temperature is generally in the range of from 50° to 350° C., preferably from 100° to 290° C., and the reaction time is generally in the range of from 1 minute to 100 hours, preferably from 30 minutes to 50 hours.

The reaction pressure for the agitation polymerization varies depending on the molecular weight of the molten monomer mixture or first prepolymer, but it is generally from 3 mmHg to atmospheric pressure, preferably from 5 mmHg to atmospheric pressure. For efficiently removing from the reaction system an aromatic monohydroxy compound, which is by-produced with the progress of the reaction, it is preferred to use a method in which an inert gas which does not adversely affect the reaction, such as nitrogen, argon, helium, carbon dioxide and lower hydrocarbon gas, is introduced to the reaction system and the inert gas is discharged together with the aromatic monohydroxy compound entrained by the inert gas.

The agitation polymerization can be carried out either in a batchwise manner or in a continuous manner. The agitation polymerization can be carried out by means of a single agitation type polymerizer vessel, but, alternatively, a combination of two or more agitation type polymerizer vessels may be used.

Generally, the amount of aromatic monohydroxy compound produced during the agitation polymerization is large and, therefore, it is preferable that the agitation type polymerizer vessel be equipped with a heat exchanger or an evaporator so as to facilitate the evaporation of the aromatic monohydroxy compound.

With respect to the polymerization apparatus and polymerization conditions for the free-fall polymerization using a perforated plate to be conducted in this preferred embodiment in which a combination of the agitation polymerization and the free-fall polymerization is employed, reference can be made to the above description provided in connection with the essential feature of the present invention.

This embodiment is explained below in more detail, referring to FIG. 3 of the accompanying drawings.

FIG. 3 is a diagram showing a system for practicing one mode of the method of the present invention. In the system of FIG. 3, three polymerizers are used in the agitation polymerization and two polymerizers are used in the free-fall polymerization, but the system of FIG. 3 is merely an example and should not be construed as limiting the scope of the present invention.

When the system of FIG. 3 is used, a monomer mixture of an aromatic dihydroxy compound and a diaryl carbonate, or a first prepolymer (defined above) is introduced to first agitation type polymerizer vessels 3 and 3', respectively, through inlet 1 of polymerizer 3 and inlet 1' of polymerizer 3'. The first agitation type polymerizer vessels 3 and 3' are the same, and are adapted to be alternately operated when, for example, it is intended to produce a prepolymer in a batchwise manner by means of each of these polymerizer vessels 3 and 3'. Each of polymerizer vessels 3 and 3' is filled with an inert gas, such as nitrogen, and the inner pressure of each polymerizer is usually controlled to a level around atmospheric pressure. A by-produced and evaporated aromatic monohydroxy compound and the like are discharged from polymerizer vessels 3 and 3', respectively, through vents 2 and 2'. Prepolymers 4 and 4', obtained by the polymerization for a predetermined reaction time under agitation in respective polymerizer vessels 3 and 3', are discharged through outlets 5 and 5', respectively, transferred by means of transfer pump 6, and introduced to a second agitation type polymerizer vessel 8 through inlet 7.

The interior of polymerizer 8 is maintained at reduced pressure, and a by-produced and evaporated aromatic monohydroxy compound and the like are discharged through vent 9. Second prepolymer (defined above) 10, obtained by the polymerization for a predetermined reaction time under agitation in polymerizer 8, is discharged through outlet 11 and transferred by means of transfer pump 12 to a first free-fall polymerizer 16, having a perforated plate.

That is, in the first free-fall polymerization, second prepolymer 10, obtained by agitation polymerization in second agitation type polymerizer vessel 8, is continuously fed to first free-fall polymerizer 16 at its introduction zone (having perforated plate 15) through inlet 13 provided in recirculation line 14, and allowed to pass through perforated plate 15 and fall freely through a free-fall polymerization reaction zone in first free-fall polymerizer 16. Second prepolymer 17 falls freely in the form of a film, a filament, a droplet or a spray. The internal pressure of the polymerizer is maintained at a predetermined level. A by-produced and evaporated aromatic monohydroxy compound and the like, and an inert gas, such as nitrogen, which is optionally fed through gas feed port 18, are discharged through vent 19. The resultant prepolymer obtained at the bottom of the free-fall polymerization reaction zone is recirculated through recirculation line 14 (having recirculation pump 20) to the introduction zone having perforated plate 15, and allowed to pass through perforated plate 15 and fall freely through the free-fall polymerization reaction zone in the free-fall polymerizer, thereby increasing the degree of polymerization of the recirculated prepolymer during the free-fall thereof. Prepolymer 21 having a predetermined degree of polymerization is continuously withdrawn through outlet 23, by means of transfer pump 22, and fed to a second free-fall polymerizer 27 at its introduction zone (having perforated plate 26) through inlet 24, and allowed to pass through perforated plate 26 and fall freely through a free-fall polymerization reaction zone in second free-fall polymerizer 27. Second prepolymer 28 falls freely in the form of a film, a filament, a droplet or a spray. The internal pressure of the polymerizer is maintained at a predetermined level. A by-produced and evaporated aromatic monohydroxy compound and the like, and an inert gas, such as nitrogen, which is optionally fed through gas feed port 29, are discharged through vent 30. Resultant molten polymer 32, obtained at the bottom of the free-fall polymerization reaction zone, is withdrawn through outlet 34 by means of discharge pump 33. With respect to both the agitation and the free-fall polymerizations, all of the polymerizers, recirculation lines, transfer lines, discharge lines and the like are heated to and kept at an elevated temperature by means of a heater and a jacket.

(2) Combination of an agitation polymerization, a wall-wetting fall polymerization and a free-fall polymerization using a perforated plate Another preferred example of modes of combinations of the free-fall polymerization process with other polymerization methods is a combination of an agitation polymerization, a wall-wetting fall polymerization and the free-fall polymerization.

In the wall-wetting fall polymerization of this embodiment, the second prepolymer (defined above) obtained in the agitation polymerization is fed in molten state to an upper portion of a wall extending through a wall-wetting fall polymerization reaction zone, and the second prepolymer is allowed to fall along and in contact with the surface of the wall, thereby effecting a wall-wetting fall polymerization of the second prepolymer during the wall-wetting fall thereof to obtain a third prepolymer at the bottom of the wall-wetting fall polymerization reaction zone. Since a large heat-transfer surface area is available in the wall-wetting fall polymerization, it can efficiently provide latent heat of evaporation of an aromatic monohydroxy compound and the like. Further, because a large evaporating surface area is available in the wall-wetting fall polymerization, an aromatic monohydroxy compound and the like can be removed efficiently, so that the polymerization can proceed swiftly.

In this embodiment, the agitation polymerization is used for producing a second prepolymer (having a number average molecular weight of from 300 to 5,000) from a molten monomer mixture of an aromatic dihydroxy compound and a diaryl carbonate, or a first prepolymer (defined above) obtained by reacting an aromatic dihydroxy compound with a diaryl carbonate; the wall-wetting fall polymerization is used for producing a third prepolymer having a higher molecular weight than that of the second prepolymer obtained in the agitation polymerization, specifically, a prepolymer having a number average molecular weight of up to approximately 10,000; and the free-fall polymerization is used for producing an aromatic polycarbonate having a higher molecular weight than that of the third prepolymer obtained in the wall-wetting fall polymerization.

The agitation type polymerizer vessel to be used in the agitation polymerization and the polymerization procedure and conditions in the agitation polymerization are as described above.

The apparatus which can be used for the wall-wetting fall polymerization includes a reactor disclosed in, for example, Chapter 11, page 461 of "Kagaku Sohchi Binran (*Handbook of Chemical Apparatus*)" edited by "Kagaku Kogaku Kyokai (the Society of Chemical Engineers, Japan)", (1989). A multiple tube type polymerizer may be used. Further, the fallen polymer obtained at a bottom of the wall-wetting fall polymerization reaction zone may be recirculated to the top of the wall for further polymerization of the polymer by a wall-wetting fall polymerization.

In the wall-wetting fall polymerization process, the reaction temperature is generally in the range of from 50° to 350° C., preferably from 100° to 290° C., and the reaction time is generally in the range of from 1 minute to 100 hours, preferably from 30 minutes to 50 hours.

The reaction pressure for the wall-wetting fall polymerization varies, depending on the molecular weight of the molten monomer mixture or second prepolymer. When the number average molecular weight is less than 1,000, the reaction pressure is preferably from 50 mmHg to atmospheric pressure. When the number average molecular weight is in the range of from 1,000 to 2,000, the reaction pressure is preferably in the range of from 3 to 80 mmHg. When the number average molecular weight is greater than 2,000, the reaction pressure is preferably 10 mmHg or less, more preferably 5 mmHg or less. For efficiently removing (from the reaction system) an aromatic monohydroxy compound by-produced with the progress of the reaction, it is preferred to use a method in which an inert gas which does not adversely affect the reaction, such as nitrogen, argon, helium, carbon dioxide and lower hydrocarbon gas, is introduced into the reaction system and the inert gas is discharged together with the aromatic monohydroxy compound entrained by the inert gas.

The wall-wetting fall polymerization can be carried out either in a batchwise manner or in a continuous manner. The wall-wetting fall polymerization can be carried out using a single wall-wetting polymerizer, but, alternatively, a combination of two or more wall-wetting polymerizers can also be used.

Generally, the amount of aromatic monohydroxy compound produced during the wall-wetting fall polymerization is large and, therefore, the wall-wetting polymerizer is preferably equipped with a heat exchanger or an evaporator so as to facilitate the evaporation of the aromatic monohydroxy compound.

With respect to the polymerization apparatus and polymerization conditions for the free-fall polymerization using a perforated plate (to be conducted in this preferred embodiment in which a combination of the agitation polymerization, the wall-wetting fall polymerization and the free-fall polymerization is employed) reference can be made to the description provided in connection with the essential feature of the present invention.

This embodiment is explained below in more detail, referring to FIG. 6 of the accompanying drawings.

FIG. 6 is a diagram showing a system for practicing another mode of the method of the present invention. In the system of FIG. 6, three polymerizers are used in the agitation polymerization, one polymerizer is used in the wall-wetting fall polymerization and two polymerizers are used in the free-fall polymerization, but the system of FIG. 6 is merely an example and should not be construed as limiting the scope of the present invention.

When the system of FIG. 6 is used, a monomer mixture of an aromatic dihydroxy compound and a diaryl carbonate, or a first prepolymer (defined above) is introduced to first agitation type polymerizer vessels 3 and 3', respectively, through inlet 1 of polymerizer vessel 3 and inlet 1' of polymerizer vessel 3'. First agitation type polymerizer vessels 3 and 3' are the same, and are adapted to be alternately operated when, for example, it is intended to produce a prepolymer in a batchwise manner by means of each of these polymerizers 3 and 3'. Each of polymerizer vessels 3 and 3' is filled with an inert gas, such as nitrogen, and the inner pressure of each polymerizer vessel is usually controlled to a level around atmospheric pressure. A by-produced and evaporated aromatic monohydroxy compound and the like are discharged from polymerizer vessels 3 and 3', respectively through vents 2 and 2'. Prepolymers 4 and 4', obtained by the polymerization for a predetermined reaction time under agitation in respective polymerizer vessels 3 and 3', are discharged through outlets 5 and 5', respectively, transferred by means of transfer pump 6, and introduced to second agitation type polymerizer vessel 8 through inlet 7.

The interior of polymerizer 8 is maintained at reduced pressure, and a by-produced and evaporated aromatic monohydroxy compound and the like are discharged through vent 9. Second prepolymer (defined above) 10, obtained by polymerization for a predetermined reaction time under agitation in polymerizer 8, is discharged through outlet 11 and transferred by means of transfer pump 12 to wall-wetting fall polymerizer 16.

That is, in the wall-wetting fall polymerization, second prepolymer (defined above) 10, obtained by agitation polymerization, is continuously fed through inlet 13 and recirculation line 14 and introduced through overflow port 15 into wall-wetting polymerizer 16. The introduced second prepolymer falls along and in contact with the inner wall of a tube in the form of film-like prepolymer 17, thereby effecting a wall-wetting fall polymerization. The internal pressure of the polymerizer is maintained at a predetermined level. A by-produced and evaporated aromatic monohydroxy compound and the like, and an inert gas, such as nitrogen, which is optionally fed through gas-feed port 18, are discharged through vent 19. The resultant prepolymer at the bottom of the polymerizer is recirculated by means of recirculation pump 20 to overflow port 15 of the wall-wetting polymerizer through recirculation line 14 and introduced to the wall-wetting fall polymerizer. Third prepolymer 21, having a predetermined degree of polymerization, is continuously withdrawn through outlet 23 and transferred by means of transfer pump 22 to first free-fall polymerizer 27 (having a perforated plate).

That is, in the first free-fall polymerization, third prepolymer 21, obtained by the wall-wetting fall polymerization in wall-wetting fall polymerizer 16, is continuously fed to first free-fall polymerizer 27 at its introduction zone (having perforated plate 26) through inlet 24 provided in recirculation line 25, and allowed to pass through perforated plate 26 and fall freely through a free-fall polymerization reaction zone in first free-fall polymerizer 27. Third prepolymer 17 falls freely in the form of a film, a filament, a droplet or a spray. The internal pressure of the polymerizer is maintained at a predetermined level. A by-produced and evaporated aromatic monohydroxy compound and the like, and an inert gas, such as nitrogen, which is optionally fed through gas feed port 29, are discharged through vent 30. The resultant prepolymer obtained at the bottom of the free-fall polymerization reaction zone is recirculated through recirculation line 14 (having recirculation pump 31) to the introduction zone having perforated plate 26, and allowed to pass through perforated plate 26 and fall freely through the free-fall polymerization reaction zone in the free-fall polymerizer, thereby increasing the degree of polymerization of the recirculated prepolymer during the free-fall thereof. Prepolymer 32 having a predetermined degree of polymerization is continuously withdrawn through outlet 34, by means of transfer pump 33, and fed to a second free-fall polymerizer 38 at its introduction zone (having perforated plate 37) through inlet 35, and allowed to pass through perforated plate 37 and fall freely through a free-fall polymerization reaction zone in a second free-fall polymerizer 38. Prepolymer 32 falls freely in the form of a film, a filament, a droplet or a spray. The internal pressure of the polymerizer is maintained at a predetermined level. A by-produced and evaporated aromatic monohydroxy compound and the like, and an inert gas, such as nitrogen, which is optionally fed through gas-feed port 40, are discharged through vent 41. Resultant molten polymer 43 obtained at the bottom of the free-fall polymerization reaction zone is withdrawn through outlet 45 by means of discharge pump 44. In the agitation, the wall-wetting fall and the free-fall polymerizations, all of the polymerizers, recirculation lines, transfer lines, discharge lines and the like are heated to and kept at an elevated temperature by means of a heater and a jacket.

With respect to materials for constructing the polymerizers to be used in the method of the present invention, there is no particular limitation, but stainless steel, nickel or glass is generally used as a material for at least inner wall portions of polymerizers.

In the present invention, it is also preferred that the inner wall of a polymerizer be wetted with part of a recirculated polymer in order to prevent sticking of scales to the inner wall of the polymerizer.

Figure 1:
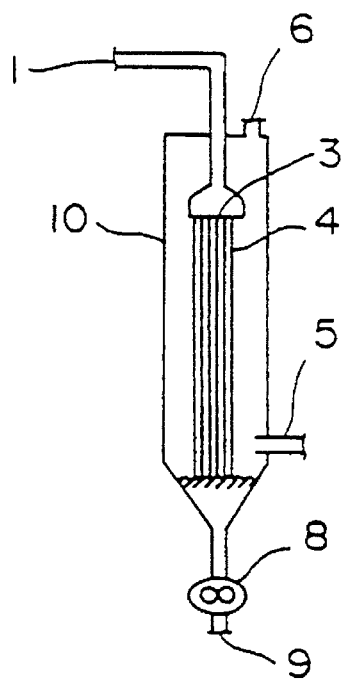
FIGS. 1 and 2 respectively show two forms of free-fall polymerization apparatus usable in the present invention.

DESCRIPTION OF REFERENCE NUMERALS (FIGS. 1 and 2)
1: Inlet for a polymerizing material
2: Recirculation line
3: Perforated plate
4: Molten monomer mixture or prepolymer in the form of a film, a filament, a droplet or a spray
5: Gas-feed port
6: Vent
7: Recirculation pump
8: Discharge pump
9: Outlet
10: Main body of polymerizer
(FIGS. 3, 4 and 5)
1: Inlet for a starting material
1': Inlet for a starting material
2: Vent
2': Vent
3: First agitation type polymerizer vessel
3': First agitation type polymerizer vessel
4: Prepolymer 4': Prepolymer
5: Outlet
5': Outlet
6: Transfer pump
7: Inlet
8: Second agitation type polymerizer vessel
9: Vent
10: prepolymer
11: Outlet
12: Transfer pump
13: Inlet
14: Recirculation line
15: Perforated plate
16: First free-fall polymerizer
17: Prepolymer in the form of a film, a filament, a droplet or a spray
18: Gas-feed port
19: Vent
20: Recirculation pump
21: Prepolymer
22: Transfer pump
23: Outlet
24: Inlet
25: Recirculation line
26: Perforated plate
27: Second free-fall polymerizer
28: Prepolymer in the form of a film, a filament, a droplet or a spray
29: Gas-feed port
30: Vent
31: Recirculation pump
32: Molten polymer
33: Discharge pump
34: Outlet
(FIGS. 6 and 7)
1: Inlet for starting material
1': Inlet for starting material
2: Vent
2': Vent
3: First agitation type polymerizer vessel
3': First agitation type polymerizer vessel
4: Prepolymer
4': Prepolymer
5: Outlet
5': Outlet
6: Transfer pump
7: Inlet
8: Second agitation type polymerizer vessel
9: Vent
10: Prepolymer
11: Outlet
12: Transfer pump
13: Inlet
14: Recirculation line
15: Overflow port
16: Wall-wetting polymerizer
17: Film-like prepolymer
18: Gas-feed port
19: Vent
20: Recirculation pump
21: Prepolymer
22: Transfer pump
23: Outlet
24: Inlet
25: Recirculation line
26: Perforated plate
27: First free-fall polymerizer
28: Prepolymer in the form of a film, a filament, a droplet or a spray
29: Gas-feed port
30: Vent
31: Recirculation pump
32: Prepolymer
33: Transfer pump
34: Outlet
35: Inlet
36: Recirculation line
37: Perforated plate
38: Second free-fall polymerizer
39: Prepolymer in the form of a film, a filament, a droplet or a spray
40: Gas-feed port
41: Vent
42: Recirculation pump
43: Molten polymer
44: Discharge pump
45: Outlet
(FIG. 8)
1: Inlet for-starting material
1': Inlet for starting material
2: Vent
2': Vent
3: First agitation type polymerizer vessel
3': First agitation type polymerizer vessel
4: Prepolymer
4': Prepolymer
5: Outlet
5': Outlet
6: Transfer pump
7: Inlet
8: Recirculation line
9: Overflow port
10: Wall-wetting polymerizer
11: Film-like prepolymer
12: Gas-feed port
13: Vent
14: Recirculation pump
15: Prepolymer
16: Transfer pump
17: Outlet
18: Inlet
19: Recirculation line
20: Perforated plate
21: First free-fall polymerizer
22: Prepolymer in the form of a film, a filament, a droplet or a spray
23: Gas-feed port
24: Vent
25: Recirculation pump
26: Prepolymer
27: Transfer pump
28: Outlet
29: Inlet
30: Recirculation line
31: Perforated plate
32: Second free-fall polymerizer
33: Prepolymer in the form of a film, a filament, a droplet or a spray
34: Gas-feed port
35: Vent
36: Recirculation pump
37: Molten polymer
38: Discharge pump
39: Outlet

BEST MODE FOR CARRYING OUT THE INVENTION

The present invention will be described in more detail with reference to the following Examples.

In the following Examples, the molecular weight is expressed in terms of the number average molecular weight (hereinafter referred to simply as "Mn") as measured by gel permeation chromatography (GPC). The color of the aromatic polycarbonate produced was evaluated, using a specimen having a thickness of 3.2 mm, in accordance with the CIELAB method, and the yellowness of the specimen is expressed in terms of the b*-value.

EXAMPLE 1

A free-fall polymerization reaction was carried out using polymerization apparatus shown in FIG. 1. Free-fall polymerizer 10 (contained in the polymerization apparatus) is equipped with perforated plate 3, which has 50 holes having a diameter of 7.5 mm and arranged in a zigzag configuration in which the distance (pitch) between the adjacent holes is 30 mm, as measured between the centers of the adjacent holes. The free-fall distance is 4 m.

A prepolymer having an Mn of 2,400, prepared by reacting bisphenol A with diphenyl carbonate in a molar ratio of 1:1.05, was continuously fed to free-fall polymerizer 10 at 5 liters/hr, so that a free-fall polymerization reaction of the prepolymer was carried out under polymerization reaction conditions wherein the reaction temperature was 250° C., the reaction pressure was 1.0 mmHg, and the flow rate of nitrogen gas was 2 liters/hr. A colorless transparent aromatic polycarbonate having an Mn of 3,100 and a b*-value of 3.1 was obtained.

EXAMPLE 2

The same polymerization apparatus as in Example 1 and shown in FIG. 1 was used. A prepolymer having an Mn of 8,900, prepared by reacting bisphenol A with diphenyl carbonate in a molar ratio of 1:1.08, was continuously fed to free-fall polymerizer 10 at 2 liters/hr, so that a free-fall polymerization reaction was carried out under polymerization reaction conditions wherein the reaction temperature was 250° C., the reaction pressure was 0.6 mmHg, and the flow rate of nitrogen gas was 1 liter/hr. A colorless transparent aromatic polycarbonate having an Mn of 11,300 and a b*-value of 3.3 was obtained.

EXAMPLE 3

Figure 2:
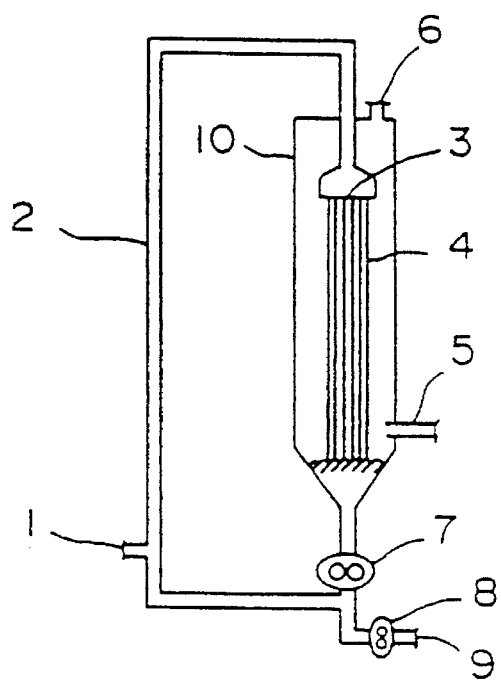

A free-fall polymerization reaction was carried out using polymerization apparatus shown in FIG. 2. Free-fall polymerizer 10 (contained in the polymerization apparatus) is equipped with perforated plate 3, which has 50 holes having a diameter of 7.5 mm and arranged in a zigzag configuration in which the distance (pitch) between the adjacent holes is 30 mm. The free-fall distance is 4 m.

20 Liters of a molten mixture of bisphenol A and diphenyl carbonate in a molar ratio of 1:1.05 were introduced to free-fall polymerizer 10, and a free-fall polymerization reaction was batchwise carried out for 1 hour under polymerization reaction conditions wherein the reaction temperature was 250° C., the reaction pressure was 100 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 600 liters/hr. The reaction was further continued for 30 minutes under a pressure of 10 mmHg. A colorless transparent aromatic polycarbonate having an Mn of 2,100 and a b*-value of 3.0 was obtained.

EXAMPLE 4

The same polymerization apparatus as in Example 3 and shown in FIG. 2 was used. 35 Liters of a prepolymer having an Mn of 800, prepared by reacting bisphenol A with diphenyl carbonate in a molar ratio of 1:1.05, were introduced to free-fall polymerizer 10, and a free-fall polymerization reaction was batchwise carried out for 1 hour under polymerization reaction conditions wherein the reaction temperature was 250° C., the reaction pressure was 10 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 400 liters/hr. A colorless transparent aromatic polycarbonate having an Mn of 2,400 and a b*-value of 3.0 was obtained.

EXAMPLE 5

The same polymerization apparatus as in Example 3 and shown in FIG. 2 was used. As prepolymer, 30 liters of an aromatic polycarbonate having an Mn of 2,400, which were the same as that obtained in Example 4, were introduced to free-fall polymerizer 10, and a free-fall polymerization reaction was batchwise carried out for 1.5 hours under polymerization reaction conditions wherein the reaction temperature was 250° C., the reaction pressure was 1.0 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 100 liters/hr. A colorless transparent aromatic polycarbonate having an Mn of 4,700 and a b*-value of 3.2 was obtained.

EXAMPLE 6

The same polymerization apparatus as in Example 3 and shown in FIG. 2 was used. As prepolymer, 30 liters of an aromatic polycarbonate having an Mn of 2,400, which were the same as that obtained in Example 4, were introduced to free-fall polymerizer 10, and a free-fall polymerization reaction was batchwise carried out for 1.5 hours under polymerization reaction conditions wherein the reaction temperature was 250° C., the reaction pressure was 1.0 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 400 liters/hr. A colorless transparent aromatic polycarbonate having an Fin of 6,000 and a b*-value of 3.2 was obtained.

EXAMPLE 7

The same polymerization apparatus as in Example 3 and shown in FIG. 2 was used. As prepolymer, 30 liters of an aromatic polycarbonate having an Mn of 2,400, which were the same as that obtained in Example 4, were introduced to free-fall polymerizer 10, and a free-fall polymerization reaction was batchwise carried out for 1.5 hours under polymerization reaction conditions wherein the reaction temperature was 250° C., the reaction pressure was 1.0 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 20 liters/hr. A colorless transparent aromatic polycarbonate having an Mn of 4,200 and a b*-value of 3.2 was obtained.

EXAMPLE 8

The same polymerization apparatus as in Example 3 and shown in FIG. 2 was used. As prepolymer, 30 liters of an aromatic polycarbonate having an Mn of 4,700, which were the same as that obtained in Example 5, were introduced to free-fall polymerizer 10, and a free-fall polymerization reaction was batchwise carried out for 6 hours under polymerization reaction conditions wherein the reaction temperature was 250° C., the reaction pressure was 1.0 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 20 liters/hr. A colorless transparent aromatic polycarbonate having an Mn of 10,000 and a b*-value of 3.3 was obtained.

EXAMPLE 9

The same polymerization apparatus as in Example 3 and shown in FIG. 2 was used. As Prepolymer, 30 liters of an aromatic polycarbonate having an Mn of 4,700, which were the same as that obtained in Example 5, were introduced to free-fall polymerizer 10, and a free-fall polymerization reaction was batchwise carried out for 2 hours under polymerization reaction conditions wherein the reaction temperature was 280° C., the reaction pressure was 0.4 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 25 liters/hr. A colorless transparent aromatic polycarbonate having an Mn of 11,000 and a b*-value of 3.3 was obtained.

EXAMPLE 10

The same polymerization apparatus as in Example 3 and shown in FIG. 2 was used. 50 Liters of a molten mixture of bisphenol A and diphenyl carbonate in a molar ratio of 1:1.15 were, introduced to free-fall polymerizer 10, and a free-fall polymerization reaction was batchwise carried out for 1 hour under polymerization reaction conditions wherein the reaction temperature was 250° C., the reaction pressure was 100 mmHg and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 600 liters/hr. The reaction were further continued for 1 hour under a pressure of 10 mmHg and at a recirculation flow rate of 400 liters/hr. A colorless transparent aromatic polycarbonate having an Mn of 2,300 and a b*-value of 3.0 was obtained.

EXAMPLE 11

The same polymerization apparatus as in Example 3 and shown in FIG. 2 was used. 30 Liters of a prepolymer having an Mn of 2,200, prepared by reacting bisphenol A with diphenyl carbonate in a molar ratio of 1:1.05, were introduced to free-fall polymerizer 10. A continuous free-fall polymerization reaction was carried out for 1,000 hours under polymerization reaction conditions wherein the reaction temperature was 250° C., the reaction pressure was 1.0 mmHg and the flow rate of nitrogen gas was 2 liters/hr to obtain a polymer, while continuously feeding the same prepolymer as used above to free-fall polymerizer 10 at a flow rate of 6 liters/hr, and recirculating a part of the polymer to the introduction zone (having perforated plate 3) of free-fall polymerizer 10 through recirculation line 2 at a recirculation flow rate of 100 liters/hr, and while withdrawing the remainder of the polymer so that the level of the polymer in the reservoir portion at the bottom of the free-fall polymerizer was constantly maintained. Results are shown in Table 1. After completion of the free-fall polymerization reaction, no accumulation of low molecular weight polymer and the like was observed on the perforated plate.

EXAMPLES 12 to 15

Polymerization reactions were individually carried out using the same polymerization apparatus as in Example 3 and shown in FIG. 2 and in substantially the same manner as in Example 11, except that the polymerization reaction conditions were varied as shown in Table 1, and that the prepolymer continuously fed to free-fall polymerizer 10 was an aromatic polycarbonate having an Mn of 6,000 which was the same as that obtained by the 1,000-hour free-fall polymerization reaction in Example 11. Results are shown in Table 1. After completion of the free-fall polymerization reaction in any of Examples 12 to 15, no accumulation of low molecular weight polymer and the like was observed on the perforated plate.

EXAMPLES 16 to 20

In each of Examples 16 to 20, substantially the same polymerization apparatus as in Example 3 and shown in FIG. 2 was used, except that the free-fall was conducted through a distance of 0.2 m (Example 16), 0.5 m (Example 17), 1 m (Example 18), 2 m (Example 19), and 8 m (Example 20). Continuous free-fall polymerization reactions were individually carried out under substantially the same polymerization reaction conditions as in Example 13, except that the distances for the free-fall were varied as mentioned above. Results are shown in Table 2. After completion of the free-fall polymerization reaction in any of Examples 16 to 20, no accumulation of low molecular weight polymer and the like was observed on the perforated plate.

EXAMPLE 21

Substantially the same polymerization apparatus as in Example 3 and shown in FIG. 2 was used, except that the perforated plate in the free-fall polymerizer had 110 holes having a hole diameter of 4.4 mm and arranged in a zigzag configuration in which the distance (pitch) between the adjacent holes was 20 mm. A continuous free-fall polymerization reaction was carried out under substantially the same polymerization reaction conditions as in Example 13, except that the above-mentioned perforated plate was used. Samples were taken from the product aromatic polycarbonates which were withdrawn at time points of 200 hours, 400 hours, 600 hours, 800 hours and 1,000 hours after the start of the reaction. The samples of the product aromatic polycarbonates withdrawn at time points of 200 hours, 400 hours, 600 hours, 800 hours and 1,000 hours after the start of the reaction were colorless and transparent, and had a b*-value of 3.3 and had Mn values of 15,500, 15,600, 15,400, 15,500 and 15,500, respectively. This shows that the polymerization reaction was stably performed. After completion of the free-fall polymerization reaction, no accumulation of low molecular weight polymer and the like was observed on the perforated plate.

EXAMPLE 22

Substantially the same polymerization apparatus as in Example 3 and shown in FIG. 2 was used, except that the perforated plate had 50 rectangular holes having a size of 4 mm×10 mm instead of the 50 circular holes having a diameter of 7.5 mm. A continuous free-fall polymerization reaction was carried out under substantially the same polymerization reaction conditions as in Example 13, except that the above-mentioned perforated plate was used. Samples were taken from the product aromatic polycarbonates which were withdrawn at time points of 200 hours, 400 hours, 600 hours, 800 hours and 1,000 hours after the start of the reaction. The samples of the product aromatic polycarbonates withdrawn at time points of 200 hours, 400 hours, 600 hours, 800 hours and 1,000 hours after the start of the reaction were colorless and transparent, and had a b*-value of 3.3 and had Mn values of 13,000, 12,900, 13,100, 13,000 and 13,100, respectively. This shows that the polymerization reaction was stably performed. After completion of the free-fall polymerization reaction, no accumulation of low molecular weight polymer and the like was observed on the perforated plate.

COMPARATIVE EXAMPLE 1

An aromatic polycarbonate was produced using a horizontal twin-screw agitation type polymerizer. The horizontal twin-screw agitation type polymerizer has a capacity of 30 liters, a L/D ratio of 6, and a twin-screw agitating blades having a rotation diameter of 140 mm.

An agitation polymerization reaction was continuously carried out while continuously feeding the same prepolymer as used in Example 15 at a flow rate of 6 liters/hr and continuously withdrawing a part of the produced aromatic polycarbonate in a manner wherein the volume of the reaction mixture in the twin-screw agitation type polymerizer was constantly maintained at 10 liters. The reaction conditions of the agitation polymerization reaction were as follows: the reaction was carried out for 1,000 hours, the reaction temperature was 250° C., and the reaction pressure was 0.3 mmHg. Samples were taken from the produced aromatic polycarbonates which were withdrawn at time points of 200 hours, 400 hours, 600 hours, 800 hours and 1,000 hours after the start of the polymerization reaction. The samples of the produced aromatic polycarbonates withdrawn at time points of 200 hours, 400 hours, 600 hours, 800 hours and 1,000 hours after the start of the reaction had b*-values of 3.6, 3.7, 3.7, 3.8 and 3.9, respectively, and had $\bar{M}n$ values of 8,500, 8,800, 8,600, 8,400 and 8,300, respectively. The rate of the increase in molecular weight was about one half as large as that observed in Example 15.

EXAMPLE 23

The same polymerization apparatus as in Example 3 and shown in FIG. 2 was used. 50 Liters of a mixture, which was prepared by adding $1\times10^{-6}$ mole of sodium hydroxide and $3\times10^{-6}$ mole of tetramethyl ammonium hydroxide to a molten mixture of bisphenol A and diphenyl carbonate (molar ratio of 1:1.05) per mole of bisphenol A, were introduced to free-fall polymerizer 10, and a free-fall polymerization reaction was batchwise carried out under polymerization reaction conditions wherein the reaction temperature was 250° C., the reaction pressure was 100 mmHg, and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 200 liters/hr. The reaction was further continued for 30 minutes under a pressure of 10 mmHg. A colorless transparent aromatic polycarbonate having an Mn of 2,500 and a b*-value of 3.0 was obtained.

EXAMPLE 24

The same polymerization apparatus as in Example 3 and shown in FIG. 2 was used. As prepolymer, 30 liters of an aromatic polycarbonate having an Mn of 2,500, which were the same as that obtained in Example 23, were introduced to free-fall polymerizer 10, and a free-fall polymerization reaction was batchwise carried out under polymerization reaction conditions wherein the reaction temperature was 250° C., the reaction pressure was 1.0 mmHg and the flow rate of nitrogen gas was 2 liters/hr to obtain a polymer, while recirculating the obtained polymer to the introduction zone (having perforated plate 3) of free-fall polymerizer 10 through recirculation line 2 at a recirculation flow rate of 100 liters/hr. The reaction was continued for 4 hours at a recirculation flow rate of 25 liters/hr. A colorless transparent aromatic polycarbonate having an Mn of 10,500 and a b*-value of 3.1 was obtained.

EXAMPLE 25

The same polymerization apparatus as in Example 3 and shown in FIG. 2 was used. A free-fall polymerization reaction was batchwise carried out for 30 minutes under substantially the same polymerization reaction conditions as in Example 3, except that 1,1-bis-(4-hydroxyphenyl)-3,3,5-trimethylcyclohexane was used instead of the bisphenol A. The reaction was continued for 30 minutes under substantially the same polymerization reaction conditions as in Example 4, except that 1,1-bis-(4-hydroxyphenyl)-3,3,5-trimethylcyclohexane was used instead of the bisphenol A. A colorless transparent aromatic polycarbonate having an Mn of 2,300 was obtained. Further, a free-fall polymerization reaction was carried out under substantially the same polymerization reaction conditions as in Example 6, except that the above-obtained aromatic polycarbonate was used as prepolymer. The thus obtained polymer was a colorless transparent aromatic polycarbonate having an Mn of 5,800 and a b*-value of 3.3.

EXAMPLE 26

Figure 3:
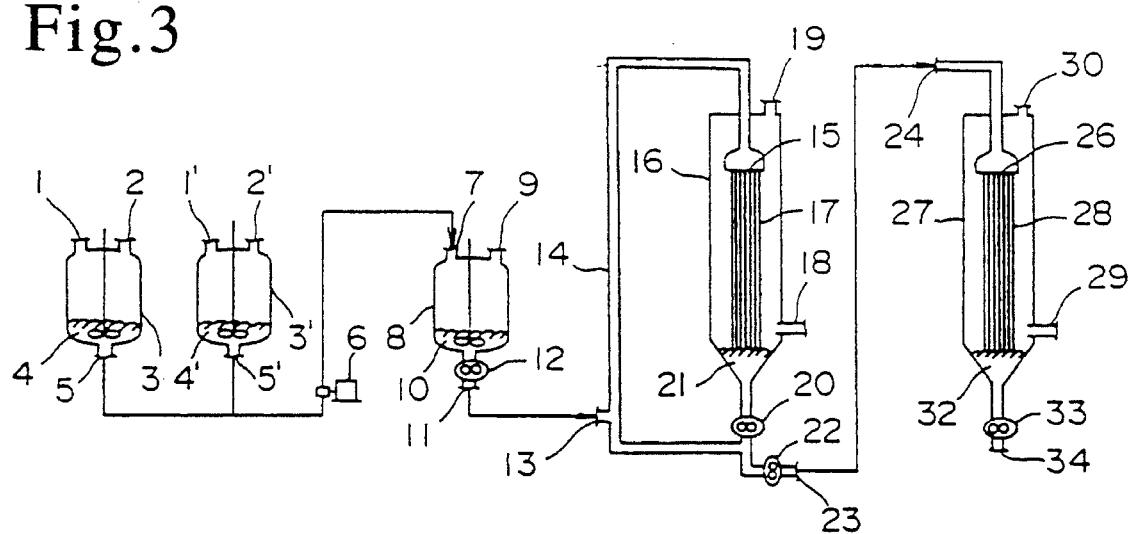
FIGS. 3 to 8 are diagrams showing various systems for practicing the method of the present invention.

An aromatic polycarbonate was produced in accordance with a system shown in FIG. 3. The system of FIG. 3 comprises first stage and second stage agitation polymerizations, and first stage and second stage free-fall polymerizations.

In the first stage agitation polymerization, a couple of first agitation type polymerizer vessels 3 and 3' were used. In the second stage agitation polymerization, second agitation type polymerizer vessel 8 was used. The capacity of each of first agitation type polymerizer vessels 3 and 3' was 100 liters, and the capacity of second agitation type polymerizer vessel 8 was 50 liters. The agitating blades of each of these three agitation type polymerizer vessels were of anchor type.

In the first stage free-fall polymerization, first free-fall polymerizer 16 was used. In the second stage free-fall polymerization second free-fall polymerizer 27 was used. Each of first free-fall polymerizer 16 and second free-fall polymerizer 27 was equipped with a perforated plate which had 50 holes having a diameter of 7.5 mm and arranged in a zigzag configuration in which the distance (pitch) between the adjacent holes was 30 mm. The free-fall distance was 4 m. Only first free-fall polymerizer 16 had a recirculation line.

The first stage agitation polymerization in first agitation type polymerizer vessels 3 and 3' was batchwise conducted, whereas the second stage agitation polymerization in second agitation type polymerizer vessel 8, and the first stage and second stage free-fall polymerizations in first and second free-fall polymerizers 16 and 27 were continuously conducted.

The polymerization reaction conditions in both of first agitation type polymerizer vessels 3 and 3' were as follows: the reaction temperature was 180° C., the reaction pressure was atmospheric pressure, and the flow rate of nitrogen gas was 1 liter/hr.

In operation, 80 kg of a monomer mixture of bisphenol A and diphenyl carbonate in a molar ratio of 1:1.10 was charged into each of first agitation type polymerizer vessels 3 and 3'. The monomer mixture in polymerizer 3 was polymerized in a molten state while agitating for 4 hours to obtain prepolymer 4. Outlet 5 was opened, and prepolymer 4 was fed to second agitation type polymerizer vessel 8 at a flow rate of 5 liters/hr.

While feeding prepolymer 4 obtained in first agitation type polymerizer vessel 3 to second agitation type polymerizer vessel 8, first agitation type polymerizer vessel 3' was operated and the monomer mixture of bisphenol A and diphenyl carbonate was polymerized in the same manner as in the agitation polymerization in first agitation type polymerizer vessel 3, to obtain prepolymer 4'.

When first agitation type polymerizer vessel 3 became empty, outlet 5 of polymerizer 3 was closed and, instead, outlet 5' of polymerizer 3' was opened, so that prepolymer 4' was fed from first agitation type polymerizer vessel 3' to second agitation type polymerizer vessel 8 at a flow rate of 5 liters/hr. In this instance, the same monomer mixture of bisphenol A and diphenyl carbonate as mentioned above was charged in polymerizer 3. While feeding prepolymer 4' obtained in first agitation type polymerizer vessel 3' to second agitation type polymerizer vessel 8, polymerizer vessel 3 was operated, so that the monomer mixture charged therein was polymerized in the same manner as mentioned above.

With respect to the batchwise polymerization in first agitation type polymerizer vessels 3 and 3' and to the alternate feeding of prepolymers 4 and 4' from polymerizers 3 and 3' to second agitation type polymerizer vessel 8, the same operation as mentioned above was repeated, so that the prepolymer (either prepolymer 4 or prepolymer 4', alternately) was continuously fed to second agitation type polymerizer vessel 8.

In second agitation type polymerizer vessel 8, a further agitation polymerization of prepolymers 4 and 4', alternately fed from first agitation type polymerizer vessels 3 and 3', was continuously carried out under polymerization reaction conditions wherein the reaction temperature was 230° C., the reaction pressure was 100 mmHg and the flow rate of nitrogen gas was 2 liters/hr, thereby obtaining prepolymer 10.

When the volume of prepolymer 10 in second agitation type polymerizer vessel 8 reached 20 liters, part of prepolymer 10 was continuously fed to first free-fall polymerizer 16 so that the volume of prepolymer 10 in second agitation type polymerizer vessel 8 was constantly maintained at 20 liters. The feeding of prepolymer 10 to first free-fall polymerizer 16 was conducted through inlet 13 provided in recirculation line 14 for polymerizer 16.

In first free-fall polymerizer 16, a free-fall polymerization of prepolymer 10 was continuously carried out under polymerization reaction conditions wherein the reaction temperature was 250° C., the reaction pressure was 2.0 mmHg and the flow rate of nitrogen gas was 1 liter/hr, thereby obtaining prepolymer 21, while recirculating a part of obtained prepolymer 21 to the introduction zone (having perforated plate 15) of first free-fall polymerizer 16 through recirculation line 14 at a recirculation flow rate of 200 liters/hr.

When the volume of prepolymer 21 in first free-fall polymerizer 16 reached 10 liters, part of prepolymer 21 was continuously fed to second free-fall polymerizer 27 so that the volume of prepolymer 21 in first free-fall polymerizer 16 was constantly maintained at 10 liters.

In second free-fall polymerizer 27, a free-fall polymerization reaction was continuously carried out under polymerization reaction conditions wherein the reaction temperature was 280° C., the reaction pressure was 0.3 mmHg, and the flow rate of nitrogen gas was 2 liters/hr, thereby obtaining polymer 32.

When the volume of polymer 32 in second free-fall polymerizer 27 reached 2 liters, polymer 32 was continuously withdrawn from second free-fall polymerizer 27 so that the volume of polymer 32 in second free-fall polymerizer 27 was constantly maintained at 2 liters.

The above-mentioned series of polymerization reactions was continuously carried out for 500 hours. Results are shown in Table 3. After completion of the series of polymerization reactions continuously conducted for 500 hours, no accumulation of low molecular weight polymer and the like was observed on the perforated plate in each of first free-fall polymerizer 16 and second free-fall polymerizer 27.

EXAMPLES 27 TO 29

In accordance with the same system as in Example 26 and shown in FIG. 3, a polymerization reaction was carried out in substantially the same manner as in Example 26 except that the polymerization reaction conditions were varied as shown in Table 3. Results are also shown in Table 3. After completion of the series of polymerization reactions, no accumulation of low molecular weight polymer and the like was observed on the perforated plate in each of first and second free-fall polymerizers 16 and 27.

EXAMPLE 30

Figure 4:
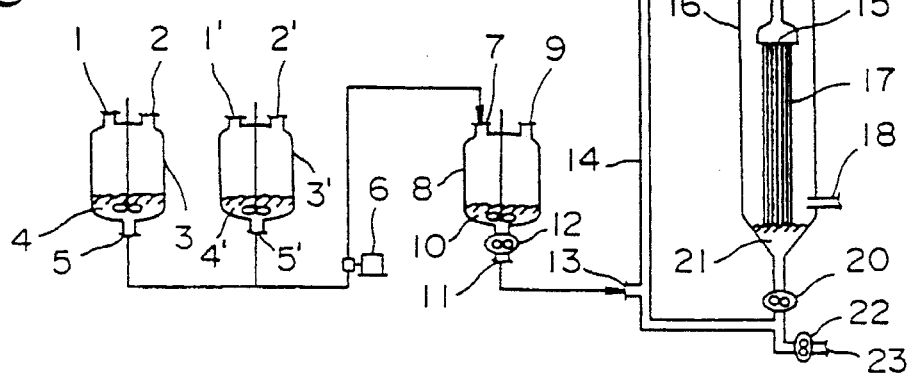

An aromatic polycarbonate was produced in accordance with a system shown in FIG. 4. The system of FIG. 4 comprises first stage and second stage agitation polymerizations, and a free-fall polymerization. In the first stage agitation polymerization, a couple of first agitation type polymerizer vessels 3 and 3' were used. In the second stage agitation polymerization, second agitation type polymerizer vessel 8 was used. In the free-fall polymerization, free-fall polymerizer 16 was used.

First agitation type polymerizer vessels 3 and 3' and second agitation type polymerizer vessel 8 were the same as those used in Example 26 and shown in FIG. 3. Free-fall polymerizer 16 was the same as first free-fall polymerizer 16 used in Example 26 and shown in FIG. 3.

The first and second stage agitation polymerizations were carried out under the same conditions as in Example 26, and the feeding of prepolymer 10 to free-fall polymerizer 16 was continuously conducted in the same manner as in Example 26.

In free-fall polymerizer 16, a free-fall polymerization of prepolymer 10 was continuously carried out under polymerization reaction conditions wherein the reaction temperature was 290° C., the reaction pressure was 0.4 mmHg and the flow rate of nitrogen gas was 2 liters/hr, thereby obtaining polymer 21, while recirculating a part of obtained polymer 21 to the introduction zone (having perforated plate 15) of free-fall polymerizer 16 through recirculation line 14 at a recirculation flow rate of 400 liters/hr.

When the volume of polymer 21 in free-fall polymerizer 16 reached 10 liters, polymer 21 was continuously withdrawn from free-fall polymerizer 16 so that the volume of polymer 21 in free-fall polymerizer 16 was constantly maintained at 10 liters.

The above-mentioned series of polymerization reactions was continuously carried out for 500 hours. 100 Hours after the start of the reaction, prepolymer 10 fed to free-fall polymerizer 16 had an Mn of 700. Samples were taken from the produced aromatic polycarbonates which were withdrawn from free-fall polymerizer 16 at time points of 100 hours, 200 hours, 300 hours, 400 hours and 500 hours after the start of the reaction were colorless and transparent, and had a b*-value of 3.4, and had Mn values of 10,800, 10,900, 10,500, 10,200 and 10,800, respectively. This shows that the series of polymerization reactions was stably performed. After completion of the series of polymerization reactions continuously conducted for 500 hours, no accumulation of low molecular weight polymer and the like was observed on the perforated plate in free-fall polymerizer 16.

EXAMPLE 31

In accordance with the same system as in Example 30 and shown in FIG. 4, first stage and second stage agitation polymerizations were carried out under the same conditions as in Example 26. Resultant prepolymer 10 obtained in second agitation type polymerizer vessel 8 had an Mn value of 700. Prepolymer 10 was fed to free-fall polymerizer 16 in an amount of 10 liters. Subsequently, a free-fall polymerization was batchwise carried out for 3 hours in free-fall polymerizer 16 under polymerization reaction conditions wherein the reaction temperature was 280° C., the reaction pressure was 0.4 mmHg and the flow rate of nitrogen gas was 2 liters/hr to obtain polymer 21, while recirculating obtained polymer 21 to the introduction zone (having perforated plate 15) of free-fall polymerizer 16 through recirculation line 14 at a recirculation flow rate of 300 liters/hr. A colorless transparent aromatic polycarbonate having an Mn value of 12,400 and a b*-value of 3.4 was obtained.

EXAMPLE 32

In accordance with the same system as in Example 30 and shown in FIG. 4, first stage and second stage agitation polymerizations were carried out under the same conditions as in Example 26. Resultant prepolymer 10 obtained in second agitation type polymerizer vessel 8 had an Mn value of 700. Prepolymer 10 was fed to free-fall polymerizer 16 in an amount of 10 liters. Subsequently, a free-fall polymerization was batchwise carried out for 1 hour in free-fall polymerizer 16 under polymerization reaction conditions wherein the reaction temperature was 250° C., the reaction pressure was 1.0 mmHg and the flow rate of nitrogen gas was 4 liters/hr, to obtain polymer 21, while recirculating obtained polymer 21 to the introduction zone (having perforated plate 15) of free-fall polymerizer 16 through recirculation line 14 at a recirculation flow rate of 600 liters/hr. A colorless transparent aromatic polycarbonate having an Mn value of 6,700 and a b*-value of 3.1 was obtained.

EXAMPLE 33

In accordance with the same system as in Example 30 and shown in FIG. 4, first stage and second stage agitation polymerizations were carried out under the same conditions as in Example 28. Resultant prepolymer 10 obtained in second agitation type polymerizer vessel 16 had an Mn value of 900. Prepolymer 10 was fed to free-fall polymerizer 16 in an amount of 10 liters. Subsequently, a free-fall polymerization was batchwise carried out for 10 hours in free-fall polymerizer 16 under polymerization reaction conditions wherein the reaction temperature was 290° C., the reaction pressure was 0.4 mmHg and the flow rate of nitrogen gas was 4 liters/hr, to obtain polymer 21, while recirculating obtained polymer 21 to the introduction zone (having perforated plate 15) of free-fall polymerizer 16 through recirculation line 14 at a recirculation flow rate of 80 liters/hr. A colorless transparent aromatic polycarbonate having an Mn of 23,000 and a b*-value of 3.5 was obtained.

EXAMPLE 34

Figure 5:
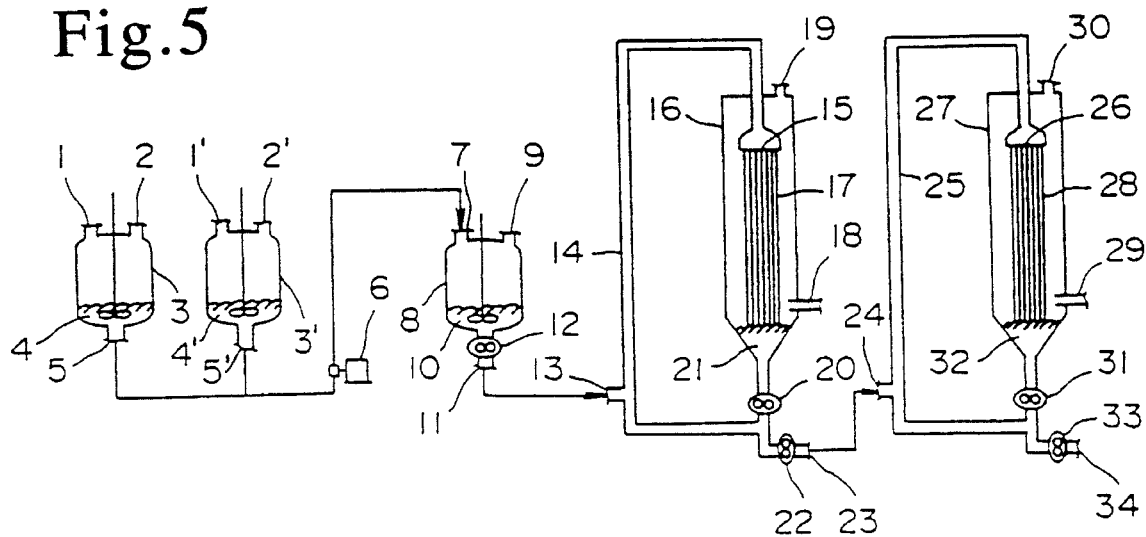

An aromatic polycarbonate was produced in accordance with a system shown in FIG. 5. The system of FIG. 5 comprises first stage and second stage agitation polymerizations and first stage and second stage free-fall polymerizations.

In the first stage agitation polymerization, a couple of first agitation type polymerizer vessels 3 and 3' were used. In the second stage agitation polymerization, second agitation type polymerizer vessel 8 was used. First agitation type polymerizer vessels 3 and 3', and second agitation type polymerizer vessel 8 are the same as used in the system of Example 26 and shown in FIG. 3.

In the first stage free-fall polymerization, first free-fall polymerizer 16 was used. In the second stage free-fall polymerization, second free-fall polymerizer 27 was used. First and second free-fall polymerizers 16 and 27 are the same as first free-fall polymerizer 16 used in the system of Example 26 and shown in FIG. 3.

The first stage and second stage agitation polymerizations were carried out under substantially the same polymerization reaction conditions as in Example 26 and in substantially the same manner as in Example 26 except that 80 kg of a monomer mixture of bisphenol A and diphenyl carbonate in a molar ratio of 1:1.04 was charged into each of first agitation type polymerizer vessels 3 and 3'.

Thus, prepolymer 10 was obtained in second agitation type polymerizer vessel 8. Prepolymer 10 was then withdrawn from polymerizer 8 and continuously fed to first free-fall polymerizer 16.

In first free-fall polymerizer 16, a first stage free-fall polymerization of prepolymer 10 was continuously carried out under polymerization reaction conditions wherein the reaction temperature was 240° C., the reaction pressure was 1.5 mmHg and the flow rate of nitrogen gas was 4 liter/hr, thereby obtaining prepolymer 21, while recirculating a part of obtained prepolymer 21 to the introduction zone (having perforated plate 15) of first free-fall polymerizer 16 through recirculation line 14 at a recirculation flow rate of 300 liters/hr.

When the volume of prepolymer 21 in first free-fall polymerizer 16 reached 10 liters, part of prepolymer 21 was continuously fed to second free-fall polymerizer 27 so that the volume of prepolymer 21 in first free-fall polymerizer 16 was constantly maintained at 10 liters.

In second free-fall polymerizer 27, a second stage free-fall polymerization reaction was continuously carried out under polymerization reaction conditions wherein the reaction temperature was 250° C., the reaction pressure was 0.3 mmHg and the flow rate of nitrogen gas was 2 liters/hr, thereby obtaining polymer 32, while recirculating part of obtained prepolymer 32 to the introduction zone (having perforated plate 26) of second free-fall polymerizer 27 through recirculation line 25 at a recirculation flow rate of 100 liters/hr.

When the volume of polymer 32 in second free-fall polymerizer 27 reached 10 liters, polymer 32 was continuously withdrawn from second free-fall polymerizer 27 so that the volume of polymer 32 in second free-fall polymerizer 27 was constantly maintained at 10 liters.

The above-mentioned series of polymerization reactions was continuously carried out for 1,000 hours. At a time point of 200 hours after the start of the reaction, prepolymer 10 fed from second agitation type polymerizer vessel 8 to first free-fall polymerizer 16 had an Mn of 780, and prepolymer 21 fed from first free-fall polymerizer 16 to second free-fall polymerizer 27 had an Mn of 5,400. Samples were taken from the produced aromatic polycarbonates which were withdrawn from second free-fall polymerizer 27 at time points of 200 hours, 400 hours, 600 hours, 800 hours and 1,000 hours after the start of the reaction. The samples were colorless and transparent, and had a b*-value of 3.2, and had Mn values of 12,100, 11,800, 11,900, 12,300 and 12,100, respectively. This shows that the series of polymerization reactions was stably performed. After completion of the series of polymerization reactions continuously conducted for 1,000 hours, no accumulation of low molecular weight polymer and the like was observed on the perforated plate in each of first and second free-fall polymerizers 16 and 27.

EXAMPLE 35

In accordance with the same system as in Example 34 and shown in FIG. 5, a series of polymerization reactions was carried out under substantially the same conditions as in Example 34 and in substantially the same manner as in Example 34 except that prepolymer 4 and 4', alternately withdrawn from first agitation type polymerizer vessels 3 and 3', were continuously fed to second agitation type polymerizer vessel 8 at a flow rate of 10 liters/hr. The above-mentioned series of polymerization reactions was continuously carried out for 1,000 hours. At a time point of 200 hours after the start of the reaction, prepolymer 10 fed from second agitation type polymerizer vessel 8 to first free-fall polymerizer 16 had an Mn of 650, and prepolymer 21 fed from first free-fall polymerizer 16 to second free-fall polymerizer 27 had an Mn of 3,900. Samples were taken from the produced aromatic polycarbonates which were continuously withdrawn from second free-fall polymerizer 27 at time points of 200 hours, 400 hours, 600 hours, 800 hours and 1,000 hours after the start of the reaction. The samples were colorless and transparent, and had a b*-value of 3.1, and had Mn values of 6,800, 6,900, 7,100, 6,700 and 7,100, respectively. This shows that the series of polymerization reactions was stably performed. After completion of the series of polymerization reactions, no accumulation of low molecular weight polymer and the like was observed on the perforated plate in each of first and second free-fall polymerizers 16 and 27.

EXAMPLE 36

In accordance with the same system as in Example 34 and shown in FIG. 5, a series of polymerization reactions was carried out under substantially the same conditions as in Example 34 and in substantially the same manner as in Example 34 except that the second stage free-fall polymerization in second free-fall polymerizer 27 was carried out under polymerization reaction conditions wherein the reaction temperature was 290° C., the reaction pressure was 0.2 mmHg, the flow rate of nitrogen gas was 2 liters/hr, the volume of prepolymer 32 was constantly maintained at 10 liters and the recirculation flow rate was 100 liters/hr. The above-mentioned series of polymerization reactions was continuously carried out for 1,000 hours. At a time point of 200 hours after the start of the reaction, prepolymer 10 fed from second agitation type polymerizer vessel 8 to first free-fall polymerizer 16 had an Mn of 780, and prepolymer 21 fed from first free-fall polymerizer 16 to second free-fall polymerizer 27 had an Mn of 5,400. Samples were taken from the produced aromatic polycarbonates which were continuously withdrawn from second free-fall polymerizer 27 at time points of 200 hours, 400 hours, 600 hours, 800 hours and 1,000 hours after the start of the reaction. These samples were colorless and transparent, and had a b*-value of 3.5, and had Mn values of 21,100, 21,400, 21,900, 22,300 and 21,600, respectively. This shows that the series of polymerization reactions was stably performed. After completion of the series of polymerization reactions, no accumulation of low molecular weight polymer and the like was observed on the perforated plate in each of first and second free-fall polymerizers 16 and 27.

EXAMPLE 37

In accordance with the same system as in Example 34 and shown in FIG. 5, a series of polymerization reactions was carried out under substantially the same conditions as in Example 34 and in substantially the same manner as in Example 34 except that the monomer mixture of bisphenol A and diphenyl carbonate in a molar ratio of 1:1.04 was mixed with $1 \times 10^{-6}$ mole of sodium hydroxide per mole of bisphenol A and $3 \times 10^{-6}$ mole of tetramethylammonium hydroxide per mole of bisphenol A, and the resultant mixture was charged into each of first agitation type polymerizer vessels 3 and 3' and polymerized in a molten state. The above-mentioned series of polymerization reactions was continuously carried out for 1,000 hours. At a time point of 200 hours after the start of the reaction, prepolymer 10 fed from second agitation type polymerizer vessel 8 to first free-fall polymerizer 16 had an Mn of 790, and prepolymer 21 fed from first agitation type polymerizer vessel 16 to second free-fall polymerizer 27 had an Mn of 5,800. Samples were taken from the produced aromatic polycarbonates which were continuously withdrawn from second free-fall polymerizer 27 at time points of 200 hours, 400 hours, 600 hours, 800 hours and 1,000 hours after the start of the reaction. These samples were colorless and transparent, and had a b*-value of 3.4, and had Mn values of 13,100, 12,700, 13,200, 13,100 and 13,300, respectively. This shows that the series of polymerization reactions was stably performed. After completion of the series of polymerization reactions, no accumulation of low molecular weight polymer and the like was observed on the perforated plate in each of first and second free-fall polymerizers 161 and 27.

EXAMPLE 38

In accordance with the same system as in Example 34 and shown in FIG. 5, a series of polymerization reactions was carried out under substantially the same reaction conditions and in substantially the same manner as in Example 34 except that 1,1-bis-(4-hydroxyphenyl)-3,3,5-trimethylcyclohexane was used instead of the bisphenol A in the first stage agitation polymerization. The above-mentioned series of polymerization reactions was continuously carried out for 1,000 hours. At a time point of 200 hours after the start of the reaction, prepolymer 10 fed from second agitation type polymerizer vessel 8 to first free-fall polymerizer 16 had an Mn of 590, and prepolymer 21 fed from first free-fall polymerizer 16 to second free-fall polymerizer 27 had an Mn of 4,300. Samples were taken from the produced aromatic polycarbonates which were withdrawn from second free-fall polymerizer 27 at time points of 200 hours, 400 hours, 600 hours, 800 hours and 1,000 hours after the start of the reaction. The samples were colorless and transparent, and had a b*-value of 3.2, and had an Mn of 9,800, 10,000, 10,100, 9,700 and 9,900, respectively. This shows that the series of polymerization reactions was stably performed. After completion of the series of polymerization reactions, no accumulation of low molecular weight polymer and the like was observed on the perforated plate in each of first and second free-fall polymerizers 16 and 27.

EXAMPLE 39

Figure 6:
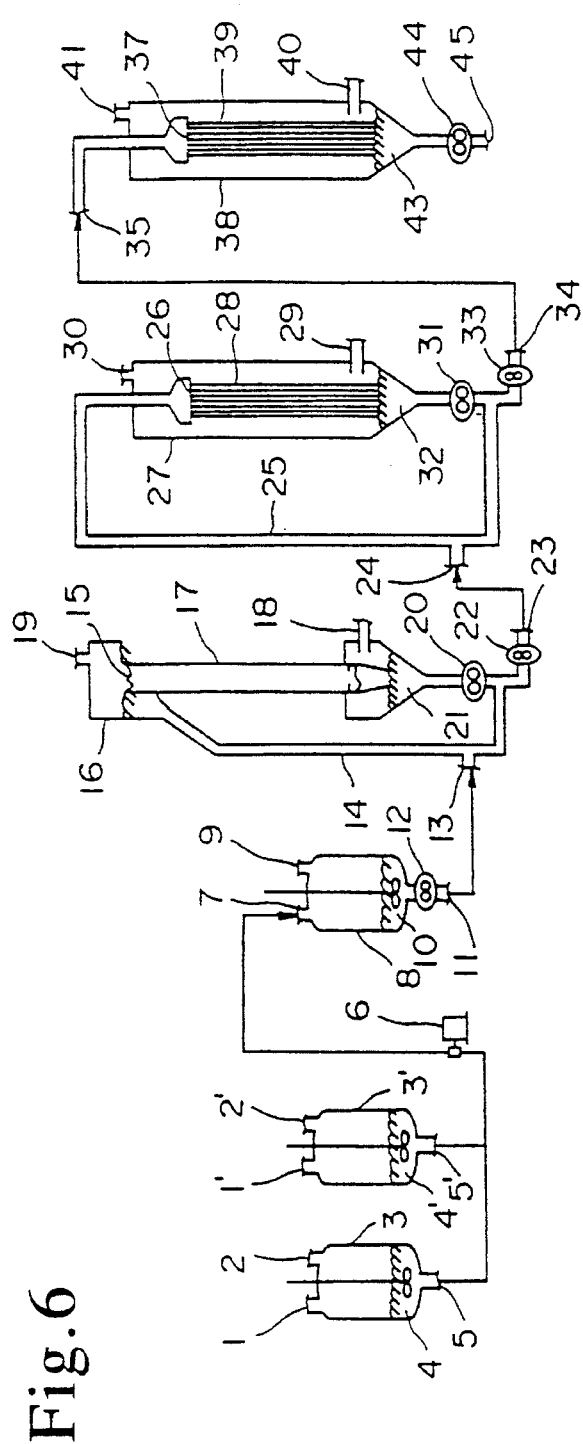

An aromatic polycarbonate was produced in accordance with a system shown in FIG. 6. The system of FIG. 6 comprises first stage and second stage agitation polymerizations, a wall-wetting fall polymerization, and first stage and second stage free-fall polymerizations.

In the first stage agitation polymerization, a couple of first agitation type polymerizer vessels 3 and 3' were used. In the second stage agitation polymerization, second agitation type polymerizer vessel 8 was used. First agitation type polymerizer vessels 3 and 3', and second agitation type polymerizer vessel 8 are the same as used in the system of Example 26 and shown in FIG. 3.

In the wall-wetting fall polymerization, wall-wetting fall polymerizer 16 was used. Wall-wetting fall polymerizer 16 had a tube having a diameter of 130 mm and a height of 5 m, and had recirculation line 14.

In the first stage free-fall polymerization, first free-fall polymerizer 27 was used. In the second stage free-fall polymerization, second free-fall polymerizer 38 was used. First and second free-fall polymerizers 27 and 38 are the same as first and second free-fall polymerizers 16 and 27 used in the system of Example 26 and shown in FIG. 3, respectively.

The first stage and second stage agitation polymerizations were carried out under the same polymerization reaction conditions as in Example 34 and in the same manner as in Example 34.

Thus, prepolymer 10 was obtained in second agitation type polymerizer vessel 8. Prepolymer 10 was then withdrawn from polymerizer 8 and continuously fed to wall-wetting fall polymerizer 16 so that the volume of prepolymer 10 in second agitation type polymerizer vessel 8 was constantly maintained at 20 liters. The feeding of prepolymer 10 to wall-wetting fall polymerizer 16 was conducted through inlet 13 provided in recirculation line 14 for wall-wetting fall polymerizer 16.

In wall-wetting fall polymerizer 16, prepolymer 10 (obtained by the second stage agitation polymerization) was continuously fed through inlet 13 and recirculation line 14 and introduced through overflow port 15 into wall-wetting polymerizer 16, thereby effecting a wall-wetting fall polymerization. The introduced prepolymer falls along and in contact with the inner wall of the tube in the form of film-like prepolymer 17. The reaction conditions of the wall-wetting fall polymerization are as follows: the reaction temperature was 240° C., the reaction pressure was 3.0 mmHg, and the flow rate of nitrogen gas was 5 liters/hr. A part of the resultant prepolymer 21 at the bottom of wall-wetting fall polymerizer 16 was recirculated to overflow port 15 of wall-wetting fall polymerizer 16 through recirculation line 14 at a recirculation flow rate of 600 liters/hr and introduced to wall-wetting fall polymerizer 16.

When the volume of prepolymer 21 at the bottom of wall-wetting fall polymerizer 16 reached 10 liters, a part of prepolymer 21 was continuously fed to first free-fall polymerizer 27 so that the volume of prepolymer 21 in wall-wetting fall polymerizer 16 was constantly maintained at 10 liters.

The subsequent first stage and second stage free-fall polymerizations were carried out under substantially the same polymerization reaction conditions as in Example 26, except that the prepolymer obtained by the wall-wetting fall polymerization was polymerized instead of the prepolymer obtained by the agitation polymerization.

In first free-fall polymerizer 27, a first stage free-fall polymerization of prepolymer 21 was continuously carried out under polymerization reaction conditions wherein the reaction temperature was 250° C., the reaction pressure was 2.0 mmHg and the flow rate of nitrogen gas was 1 liter/hr, thereby obtaining prepolymer 32, while recirculating a part of obtained prepolymer 32 to the introduction zone (having perforated plate 26) of first free-fall polymerizer 27 through recirculation line 25 at a recirculation flow rate of 200 liters/hr.

When the volume of prepolymer 32 in first free-fall polymerizer 27 reached 10 liters, a part of prepolymer 32 was continuously fed to second free-fall polymerizer 38 so that the volume of prepolymer 32 in first free-fall polymerizer 27 was constantly maintained at 10 liters.

In second free-fall polymerizer 38, a second stage free-fall polymerization reaction was continuously carried out under polymerization reaction conditions wherein the reaction temperature was 280° C., the reaction pressure was 0.3 mmHg, and the flow rate of nitrogen gas was 2 liters/hr, thereby obtaining polymer 43.

When the volume of polymer 43 in second free-fall polymerizer 38 reached 2 liters, polymer 43 was continuously withdrawn from second free-fall polymerizer 38 so that the volume of polymer 43 in second free-fall polymerizer 38 was constantly maintained at 2 liters.

The above-mentioned series of polymerization reactions was continuously carried out for 1,000 hours. Results are shown in Table 4. After completion of the series of polymerization reactions continuously conducted for 1,000 hours, no accumulation of low molecular weight polymer and the like was observed on the perforated plate in each of first and second free-fall polymerizers 27 and 38.

EXAMPLE 40 TO 42

In accordance with the same system as in Example 39 and shown in FIG. 6, a series of polymerization reactions was carried out in substantially the same manner as in Example 39 except the polymerization reaction conditions were varied as shown in Table 4. Results are also shown in Table 4. After completion of the series of polymerization reactions, no accumulation of low molecular weight polymer and the like was observed on the perforated plate in each of first and second free-fall polymerizers 27 and 38.

EXAMPLE 43

Figure 7:
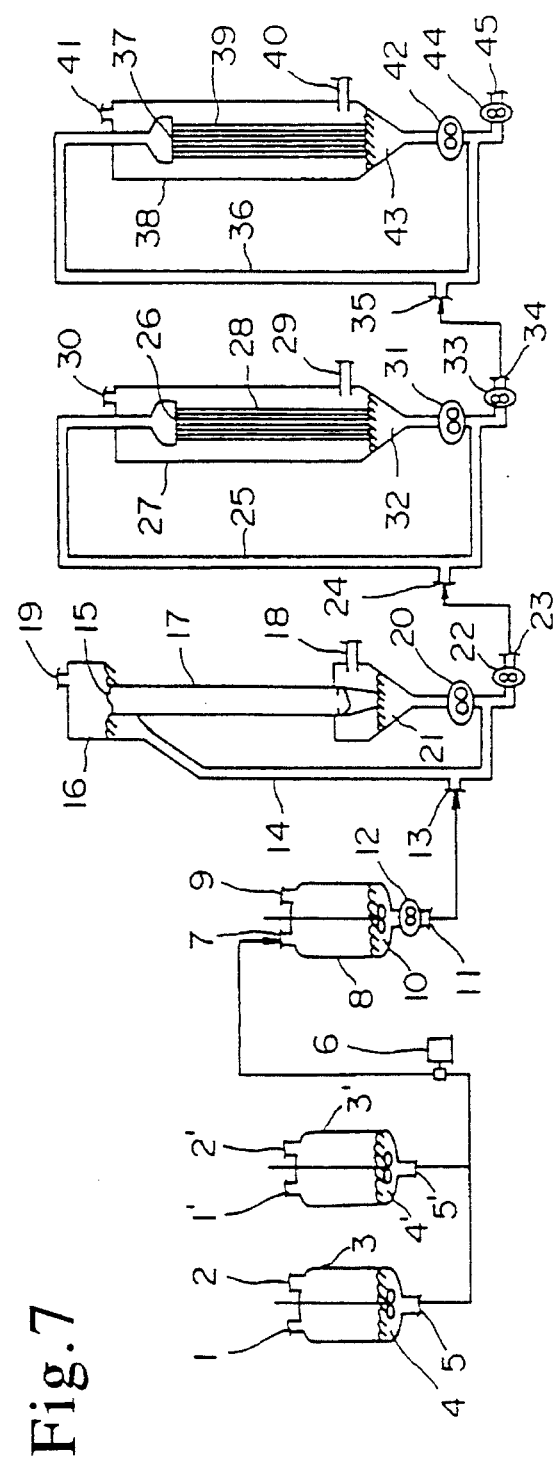

An aromatic polycarbonate was produced in accordance with a system shown in FIG. 7. The system of FIG. 7 comprises first stage and second stage agitation polymerizations, a wall-wetting fall polymerization, and first stage and second stage free-fall polymerizations.

In the first stage agitation polymerization, a couple of first agitation type polymerizer vessels 3 and 3' were used. In the second stage agitation polymerization, second agitation type polymerizer vessel 8 was used. First agitation type polymerizer vessels 3 and 3', and second agitation type polymerizer vessel 8 are the same as used in the system of Example 26 and shown in FIG. 3.

In the wall-wetting fall polymerization, wall-wetting fall polymerizer 16 was used. Wall-wetting fall polymerizer 16 is the same as used in the system of Example 39 and shown in FIG. 6.

In the first stage free-fall polymerization, first free-fall polymerizer 27 was used. In the second stage free-fall polymerization, second free-fall polymerizer 38 was used. First stage and second stage free-fall polymerizers 27 and 38 are the same as first stage and second stage free-fall polymerizers 16 and 27 used in the system of Example 34 and shown in FIG. 5, respectively.

The first stage and second stage agitation polymerizations and the wall-wetting fall polymerization were carried out under substantially the same polymerization reaction conditions as in Example 39 and in substantially the same manner as in Example 39.

Thus, prepolymer 21 was obtained in wall-wetting fall polymerizer 16. Prepolymer 21 was then withdrawn from wall-wetting fall polymerizer 16 and continuously fed to first free-fall polymerizer 27.

A first stage free-fall polymerization of prepolymer 21 was continuously carried out in first free-fall polymerizer 27 under polymerization reaction conditions wherein the reaction temperature was 260° C., the reaction pressure was 2.0 mmHg and the flow rate of nitrogen gas was 2 liters/hr, thereby obtaining prepolymer 32, while recirculating a part of obtained prepolymer 32 to the introduction zone (having perforated plate 26) of first free-fall polymerizer 27 through recirculation line 25 at a recirculation flow rate of 150 liters/hr.

When the volume of prepolymer 32 in first free-fall polymerizer 27 reached 10 liters, a part of prepolymer 32 was continuously fed to second free-fall polymerizer 38 so that the volume of prepolymer 32 in first free-fall polymerizer 27 was constantly maintained at 10 liters.

A second stage free-fall polymerization reaction was continuously carried out in second free-fall polymerizer 38 under polymerization reaction conditions wherein the reaction temperature was 280° C., the reaction pressure was 0.6 mmHg, and the flow rate of nitrogen gas was 2 liters/hr, thereby obtaining polymer 43, while recirculating a part of obtained polymer 43 to the introduction zone (having perforated plate 37) of second free-fall polymerizer 38 through recirculation line 36 at a recirculation flow rate of 100 liters/hr.

When the volume of polymer 43 in second free-fall polymerizer 38 reached 10 liters, polymer 43 was continuously withdrawn from second free-fall polymerizer 38 so that the volume of polymer 43 in second free-fall polymerizer 38 was constantly maintained at 10 liters.

The above-mentioned series of polymerization reactions was continuously carried out for 1,000 hours. At a time point of 200 hours after the start of the reaction, prepolymer 10 fed from second agitation type polymerizer vessel 8 to wall-wetting fall polymerizer 16 had an Mn of 780, prepolymer 21 fed from wall-wetting fall polymerizer 16 to first free-fall polymerizer 27 had an Mn of 4,100, and prepolymer 32 fed from first free-fall polymerizer 27 to second free-fall polymerizer 38 had an Mn of 10,100. Samples were taken from the produced aromatic polycarbonates which were withdrawn from second free-fall polymerizer 38 at time points of 200 hours, 400 hours, 600 hours, 800 hours and 1,000 hours after the start of the reaction were colorless and transparent, and had a b*-value of 3.4, and had Mn values of 18,300, 17,900, 18,400, 18,200 and 18,000, respectively. This shows that the series of polymerization reactions was stably performed. After completion of the series of polymerization reactions continuously conducted for 1,000 hours, no accumulation of low molecular weight polymer and the like was observed on the perforated plate in each of first and second free-fall polymerizers 27 and 38.

EXAMPLE 44

In accordance with the same system as in Example 43 and shown in FIG. 7, a series of polymerization reactions was carried out under substantially the same conditions as in Example 43 and in substantially the same manner as in Example 43 except that the prepolymer obtained in the first stage agitation polymerization (either prepolymer 4 produced in first agitation type polymerizer vessel 3 or prepolymer 4' produced in first agitation type polymerizer vessel 3', alternately) was continuously fed to second agitation type polymerizer vessel 8 at a flow rate of 10 liters/hr.

The series of polymerization reactions was continuously carried out for 1,000 hours. At a time point of 200 hours after the start of the reaction, prepolymer 10 fed from second agitation type polymerizer vessel 8 to wall-wetting fall polymerizer 16 had an Mn of 650, prepolymer 21 fed from wall-wetting fall polymerizer 16 to first free-fall polymerizer 27 had an Mn of 3,400, and prepolymer 32 fed from first free-fall polymerizer 27 to second free-fall polymerizer 38 had an Mn of 7,900. Samples were taken from the produced aromatic polycarbonates which were withdrawn from second free-fall polymerizer 38 at time points of 200 hours, 400 hours, 600 hours, 800 hours and 1,000 hours after the start of the reaction. The samples were colorless and transparent, and had a b*-value of 3.2, and had Mn values of 11,800, 12,100, 11,900, 12,300 and 12,200, respectively. This shows that the series of polymerization reactions was stably performed. After completion of the series of polymerization reactions continuously conducted for 1,000 hours, no accumulation of low molecular weight polymer and the like was observed on the perforated plate in each of first and second free-fall polymerizers 27 and 38.

EXAMPLES 45 TO 48

In accordance with the same system as in Example 44 and shown in FIG. 7, a series of polymerization reactions was carried out under substantially the same conditions as in Example 44 and in substantially the same manner as in Example 44, except that a mixture of bisphenol A and an aromatic dihydroxy compound (shown in Table 5) other than bisphenol A was used instead of the bisphenol A. In the above-mentioned mixture, a molar ratio of bisphenol A to another aromatic dihydroxy compound was 1:1, and the mixture was used in a molar amount equal to the amount of the bisphenol A used in Example 44. Results are shown in Table 5.

EXAMPLE 49

In accordance with the same system as in Example 43 and shown in FIG. 7, a series of polymerization reactions was carried out in substantially the same manner as in Example 43 except that in second free-fall polymerizer 38, the polymerization reaction conditions were as follows: the reaction temperature was 290° C., the reaction pressure was 0.2 mmHg, the flow rate of nitrogen gas was 2.5 liters/hr, the volume of polymer 43 in second free-fall polymerizer 38 was constantly maintained at 10 liters, and the recirculation flow rate was 75 liters/hr.

The above-mentioned series of polymerization reactions was continuously carried out for 1,000 hours. At a time point of 200 hours after the start of the reaction, prepolymer 10 fed from second agitation type polymerizer vessel 8 to wall-wetting fall polymerizer 16 had an Mn of 780, prepolymer 21 fed from wall-wetting fall polymerizer 16 to first free-fall polymerizer 27 had an Mn of 4,100, and prepolymer 32 fed from first free-fall polymerizer 27 to second free-fall polymerizer 38 had an Mn of 10,100. Samples were taken from the produced aromatic polycarbonates which were withdrawn from second free-fall polymerizer 38 at time points of 200 hours, 400 hours, 600 hours, 800 hours and 1,000 hours after the start of the reaction. The samples were colorless and transparent, and had a b*-value of 3.5, and had Mn values of 23,800, 24,100, 23,900, 24,800 and 24,200, respectively. This shows that the series of polymerization reactions was stably performed. After completion of the series of polymerization reactions continuously conducted for 1,000 hours, no accumulation of low molecular weight polymer and the like was observed on the perforated plate in each of first and second free-fall polymerizers 27 and 38.

EXAMPLE 50

In accordance with the same system as in Example 43 and shown in FIG. 7, first stage and second stage agitation polymerizations, a wall-wetting fall polymerization, and a first stage free-fall polymerization were carried out in substantially the same manner as in Example 43 and under substantially the same conditions as in Example 43.

Thus, prepolymer 26 having an Mn of 10,100 was obtained in first free-fall polymerizer 27. Prepolymer 26 was then withdrawn from polymerizer 26 and continuously fed to second free-fall polymerizer 32 in an amount of 10 liters. Subsequently, a second stage free-fall polymerization reaction was batchwise carried out in second free-fall polymerizer 32 for 7 hours under polymerization reaction conditions wherein the reaction temperature was 280° C., the reaction pressure was 0.4 mmHg, and the flow rate of nitrogen gas was 2 liters/hr, while recirculating obtained polymer 37 to the introduction zone (having perforated plate 31) of free-fall polymerizer 32 through recirculation line 30 at a recirculation flow rate of 100 liters/hr. A colorless transparent aromatic polycarbonate having an Mn of 24,900 and a b*-value of 3.5 was obtained.

EXAMPLE 51

Figure 8:
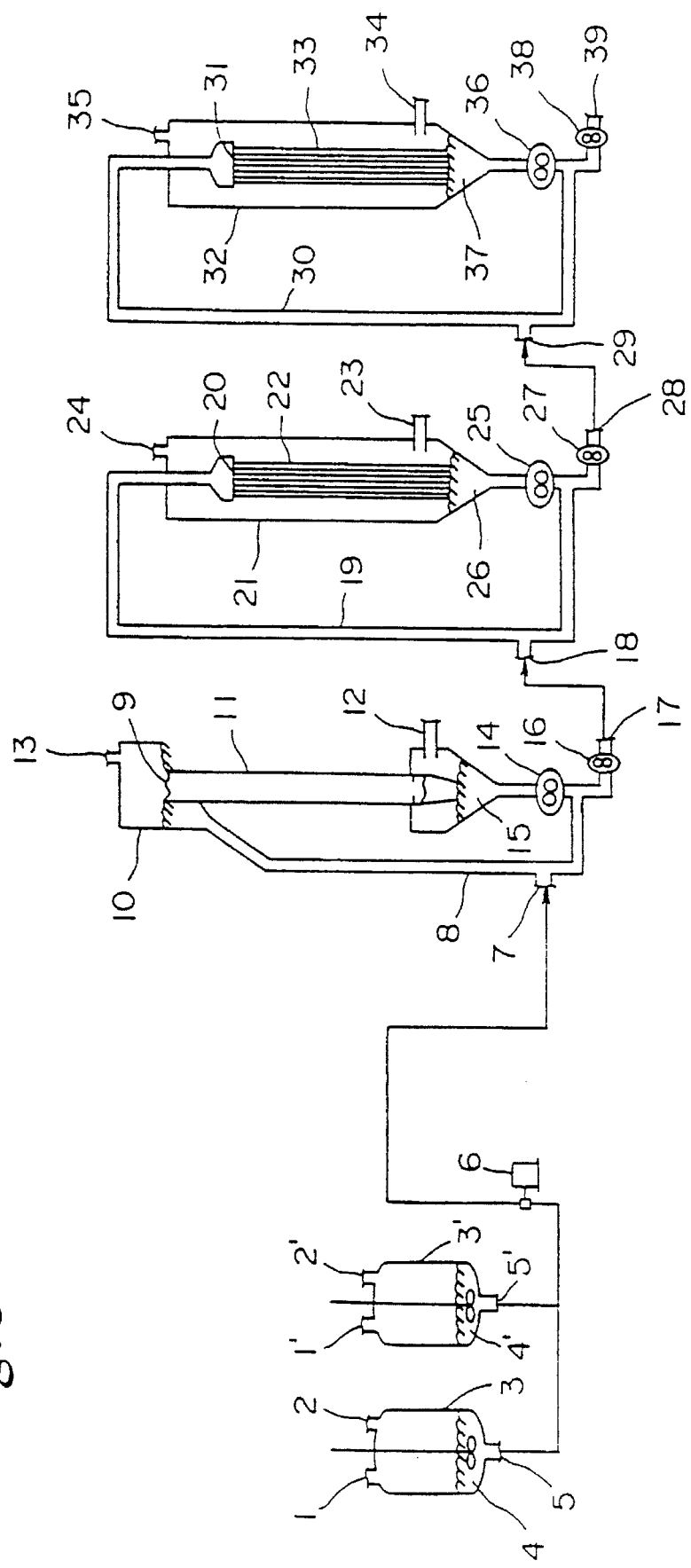

An aromatic polycarbonate was produced in accordance with the system shown in FIG. 8. The system shown in FIG. 8 was substantially the same as that shown in FIG. 7, except that the second agitation type polymerizer vessel was omitted.

A series of polymerization reactions was carried out under substantially the same conditions as in Example 43 and in substantially the same manner as in Example 43, except that the second agitation type polymerizer vessel was omitted as mentioned above, the reaction temperature and pressure of the wall-wetting fall polymerization were 230° C. and 100 mmHg, respectively, and that the reaction pressure in the first free-fall polymerization was 5 mmHg.

The above-mentioned series of polymerization reactions was continuously carried out for 1,000 hours. Samples were taken from the produced aromatic polycarbonates which were withdrawn from second free-fall polymerizer 32 at time points of 200 hours, 400 hours, 600 hours, 800 hours and 1,000 hours after the start of the reaction. The samples were colorless and transparent, and had a b*-value of 3.4, and had Mn values of 14,800, 14,600, 14,900, 14,800 and 14,700, respectively. This shows that the series of polymerization reactions was stably performed. After completion of the series of polymerization reactions continuously conducted for 1,000 hours, no accumulation of low molecular weight polymer and the like was observed on the perforated plate in each of first and second free-fall polymerizers 21 and 32.

TABLE 1

|  | Ex. 11 | Ex. 12 | Ex. 13 | Ex. 14 | Ex. 15 |
|---|---|---|---|---|---|
| Molecular weight of prepolymer | 2,200 | 6,000 | 6,000 | 6,000 | 6,000 |
| Amount of prepolymer introduced to start free-fall polymerization reaction (liter) | 30 | 30 | 30 | 30 | 30 |
| Flow rate of continuously fed prepolymer (liter/hr) | 6 | 4 | 1.5 | 1.2 | 5 |
| Reaction temperature (°C.) | 250 | 250 | 250 | 285 | 250 |
| Reaction pressure (mmHg) | 1.0 | 0.4 | 0.4 | 0.4 | 0.3 |
| Flow rate of nitrogen gas (liter/hr) | 2 | 2 | 2 | 2 | 2 |
| Recirculation flow rate (liter/hr) | 100 | 20 | 20 | 20 | 100 |
| Aro-      200 Mn | 6,000 | 10,810 | 13,000 | 21,800 | 12,100 |

TABLE 1-continued

|  |  |  | Ex. 11 | Ex. 12 | Ex. 13 | Ex. 14 | Ex. 15 |
|---|---|---|---|---|---|---|---|
| matic poly-carbo-nates | hrs | b*-value | 3.3 | 3.3 | 3.3 | 3.3 | 3.2 |
|  | 400 hrs | Mn | 6,100 | 10,790 | 13,200 | 21,800 | 11,900 |
|  |  | b*-value | 3.3 | 3.3 | 3.3 | 3.4 | 3.2 |
|  | 600 hrs | Mn | 6,000 | 10,800 | 13,100 | 21,900 | 12,000 |
|  |  | b*-value | 3.3 | 3.3 | 3.3 | 3.4 | 3.2 |
|  | 800 hrs | Mn | 5,900 | 10,790 | 13,200 | 21,700 | 11,900 |
|  |  | b*-value | 3.3 | 3.3 | 3.3 | 3.4 | 3.2 |
|  | 1,000 hrs | Mn | 6,000 | 10,780 | 13,200 | 21,800 | 12,100 |
|  |  | b*-value | 3.3 | 3.3 | 3.3 | 3.4 | 3.2 |

TABLE 2

|  |  | Aromatic polycarbonate (obtained after 1,000-hr free-fall polymerization reaction) | |
|---|---|---|---|
|  | Free-fall distance (m) | b*-value | Mn |
| Example 16 | 0.2 | 3.3 | 7,200 |
| Example 17 | 0.5 | 3.3 | 10,800 |
| Example 18 | 1 | 3.3 | 12,600 |
| Example 19 | 2 | 3.3 | 12,900 |
| Example 20 | 8 | 3.3 | 13,400 |

TABLE 3

|  |  |  |  | Ex. 26 | Ex. 27 | Ex. 28 | Ex. 29 |
|---|---|---|---|---|---|---|---|
| Agitation polymerization | First stage agitation polymerization | | Diphenyl carbonate/bisphenol A (molar ratio) | 1.10 | 1.20 | 1.05 | 1.05 |
|  |  | | Flow rate of prepolymer 4 or 4' fed to second agitation type polymerizer vessel 8 (liter/hr) | 5 | 5 | 2 | 2 |
|  | Second Stage agitation polymerization | | Volume of prepolymer 10 in second agitation type polymerizer vessel 8 (liter) | 20 | 20 | 20 | 20 |
|  |  | | Reaction temperature (°C.) | 230 | 230 | 235 | 235 |
|  |  | | Reaction pressure (mmHg) | 100 | 100 | 50 | 50 |
|  |  | | Flow rate of nitrogen gas (liter/hr) | 2 | 2 | 1 | 1 |
| Free-fall polymerization | First stage free-fall polymerization | | Mn of prepolymer 10 to be fed to first free-fall polymerizer 16 (100 hours after start of first stage agitation polymerization reaction) | 700 | 670 | 900 | 900 |
|  |  | | Reaction temperature | 250 | 250 | 250 | 250 |
|  |  | | Reaction pressure (mmHg) | 2.0 | 2.5 | 2.5 | 2.5 |
|  |  | | Flow rate of nitrogen gas (liter/hr) | 1 | 2 | 1 | 0 |
|  |  | | Volume of prepolymer 21 in first free-fall polymerizer 16 (liter) | 10 | 10 | 10 | 10 |
|  |  | | Recirculation flow rate (liter/hr) | 200 | 400 | 300 | 300 |
|  | Second stage free-fall polymerization | | Mn of prepolymer to be fed to second free-fall polymerizer 27 (100 hours after start of first stage agitation polymerization reaction) | 5,500 | 5,200 | 6,900 | 6,100 |
|  |  | | Reaction temperature (°C.) | 280 | 260 | 285 | 285 |
|  |  | | Reaction pressure (mmHg) | 0.3 | 0.5 | 0.3 | 0.3 |
|  |  | | Flow rate of nitrogen gas (liter/hr) | 2.0 | 2.5 | 2.0 | 0 |
|  |  | | Volume of prepolymer 32 obtained in second free-fall polymerizer 27 (liter) | 2 | 2 | 2 | 2 |
| Aromatic polycarbonates | | 10 hrs | Mn | 10,330 | 7,200 | 16,100 | 14,500 |
|  | | | b*-value | 3.3 | 3.0 | 3.4 | 3.4 |
|  | | 200 hrs | Mn | 10,200 | 7,350 | 15,900 | 14,700 |
|  | | | b*-value | 3.3 | 3.0 | 3.4 | 3.4 |
|  | | 300 hrs | Mn | 10,400 | 6,950 | 16,500 | 14,600 |
|  | | | b*-value | 3.3 | 3.0 | 3.4 | 3.4 |
|  | | 400 hrs | Mn | 10,100 | 7,100 | 16,200 | 14,700 |
|  | | | b*-value | 3.3 | 3.0 | 3.4 | 3.4 |

TABLE 3-continued

|  |  |  | Ex. 26 | Ex. 27 | Ex. 28 | Ex. 29 |
|---|---|---|---|---|---|---|
|  | 500 hrs | Mn | 10,200 | 7,300 | 16,300 | 14,600 |
|  |  | b*-value | 3.3 | 3.0 | 3.4 | 3.4 |

TABLE 4

| | | | Ex. 39 | Ex. 40 | Ex. 41 | Ex. 42 |
|---|---|---|---|---|---|---|
| Agitation polymerization | First stage agitation polymerization | Diphenyl carbonate/ bisphenol A (molar ratio) | 1.04 | 1.04 | 1.04 | 1.04 |
| | | Flow rate of prepolymer 4 or 4' fed to second agitation type polymerizer vessel 8 (liter/hr) | 5 | 10 | 5 | 5 |
| | Second stage agitation polymerization | Volume of prepolymer 10 in second agitation type prepolymer vessel 8 (liter) | 20 | 20 | 20 | 20 |
| | | Reaction temperature (°C.) | 230 | 230 | 230 | 230 |
| | | Reaction pressure (mmHg) | 100 | 100 | 100 | 100 |
| | | Flow rate of nitrogen gas (liter/hr) | 2 | 2 | 2 | 2 |
| Wall-wetting fall polymerization | | Mn of prepolymer 10 to be fed to wall-wetting fall polymerizer 16 (100 hours after start of first stage agitation polymerization reaction) | 780 | 650 | 780 | 780 |
| | | Reaction temperature (°C.) | 240 | 240 | 240 | 250 |
| | | Reaction pressure (mmHg) | 3.0 | 3.0 | 3.0 | 2.5 |
| | | Flow rate of nitrogen gas (liter/hr) | 5 | 5 | 5 | 2 |
| | | Volume of prepolymer 21 in wall-wetting fall polymerizer 16 | 10 | 10 | 10 | 10 |
| | | Recirculation flow rate (liter/hr) | 600 | 600 | 600 | 800 |
| Free-fall polymerization | First stage free-fall polymerization | Mn of prepolymer 21 to be fed to first free-fall polymerizer (100 hours after start of first stage polymerization reaction) | 4,100 | 3,400 | 4,100 | 4,800 |
| | | Reaction temperature (°C.) | 250 | 250 | 270 | 250 |
| | | Reaction pressure (mmHg) | 2.0 | 2.0 | 2.0 | 2.0 |
| | | Flow rate of nitrogen gas (liter/hr) | 1 | 1 | 2 | 1 |
| | | Volume of prepolymer 32 obtained in first free-fall polymerizer 27 | 10 | 10 | 10 | 10 |
| | | Recirculation flow rate (liter/hr) | 200 | 400 | 150 | 200 |
| | Second stage free-fall polymerization | Mn of prepolymer to be fed to second free-fall polymerizer 38 (100 hours after start of first stage agitation polymerization reaction) | 8,800 | 7,300 | 10,400 | 9,800 |
| | | Reaction temperature (°C.) | 280 | 280 | 290 | 280 |
| | | Reaction pressure (mmHg) | 0.3 | 0.3 | 0.3 | 0.3 |
| | | Flow rate of nitrogen gas (liter/hr) | 2.0 | 2.0 | 2.5 | 2.0 |
| | | Volume of prepolymer 43 obtained in second free-fall polymerizer 38 | 2 | 2 | 2 | 2 |
| Aromatic Polycarbonates | 200 hrs | Mn | 13,100 | 9,600 | 17,200 | 15,500 |
| | | b*-value | 3.3 | 3.2 | 3.5 | 3.4 |

TABLE 4-continued

|  |  | Ex. 39 | Ex. 40 | Ex. 41 | Ex. 42 |
|---|---|---|---|---|---|
| 400 hrs | Mn | 12,900 | 9,800 | 17,600 | 15,000 |
|  | b*-value | 3.3 | 3.2 | 3.5 | 3.4 |
| 600 hrs | Mn | 13,200 | 9,500 | 17,400 | 14,900 |
|  | b*-value | 3.3 | 3.2 | 3.5 | 3.4 |
| 800 hrs | Mn | 13,400 | 9,700 | 17,300 | 15,300 |
|  | b*-value | 3.3 | 3.2 | 3.5 | 3.4 |
| 1,000 hrs | Mn | 13,000 | 9,600 | 17,700 | 15,400 |
|  | b*-value | 3.3 | 3.2 | 3.5 | 3.4 |

TABLE 5

| | Aromatic dihydroxy compound other than bisphenol A | Aromatic polycarbonate (obtained after 1,000-hr free-fall polymerization reaction) | |
|---|---|---|---|
| | | b*-value | Mn |
| Ex. 45 | HO—⟨C$_6$H$_4$⟩—S—⟨C$_6$H$_4$⟩—OH | 3.3 | 10,500 |
| Ex. 46 | HO—⟨C$_6$H$_4$⟩—SO$_2$—⟨C$_6$H$_4$⟩—OH | 3.3 | 11,500 |
| Ex. 47 | HO—⟨3,5-(CH$_3$)$_2$-C$_6$H$_2$⟩—C(=O)—⟨3,5-(CH$_3$)$_2$-C$_6$H$_2$⟩—OH | 3.4 | 11,000 |
| Ex. 48 | HO—⟨3,5-(CH$_3$)$_2$-C$_6$H$_2$⟩—CH$_2$—⟨3,5-(CH$_3$)$_2$-C$_6$H$_2$⟩—OH | 3.4 | 12,000 |

INDUSTRIAL APPLICABILITY

According to the method of the present invention, colorless and high quality aromatic polycarbonates can be produced at a high polymerization rate and stably for a prolonged period of time, using an apparatus which has excellent sealing properties under high vacuum and maintenance of which is easy.

We claim:

1. A method for producing an aromatic polycarbonate, which comprises:

introducing to an introduction zone having a perforated plate at least one polymerizing material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, and allowing said polymerizing material to pass downwardly through said perforated plate and fall freely through a free-fall polymerization reaction zone, thereby effecting a free-fall polymerization of said polymerizing material during the free-fall thereof to obtain a polymer at a bottom of said free-fall polymerization reaction zone.

2. A method according to claim 1, which further comprises recirculating to said introduction zone having the perforated plate a part or all of said polymer obtained at the bottom of said free-fall polymerization reaction zone, and allowing said recirculated polymer to pass downwardly through said perforated plate and fall freely through said free-fall polymerization reaction zone, thereby increasing the degree of polymerization of said recirculated polymer during the free-fall thereof to a predetermined level.

3. A method according to claim 1, wherein said introduction of the polymerizing material to said introduction zone having the perforated plate is continuously conducted, and which method further comprises continuously conducting a sequence of steps of recirculating to said introduction zone having the perforated plate a part of said polymer obtained at the bottom of said free-fall polymerization reaction zone, and allowing an admixture of said continuously introduced polymerizing material and the recirculated polymer to pass downwardly through said perforated plate and fall freely through said free-fall polymerization reaction zone, thereby continuously effecting a free-fall polymerization of said admixture during the free-fall thereof, while continuously withdrawing the remainder of said polymer obtained at the bottom of said free-fall polymerization reaction zone.

4. A method according to claim 1, wherein said polymerizing material is the molten prepolymer.

5. A method according to claim 4, wherein said molten prepolymer is a molten second prepolymer which has been obtained by a process comprising polymerizing a starting material in a molten state, while agitating, in an agitation type polymerizer vessel, said starting material being at least one member selected from the group consisting of:

a monomer mixture of an aromatic dihydroxy compound and a diaryl carbonate, and a first prepolymer obtained by reacting an aromatic dihydroxy compound with a diaryl carbonate, thereby effecting an agitation polymerization of said starting material, and wherein said molten second prepolymer is subjected to said free-fall polymerization to obtain said polymer at the bottom of said free-fall polymerization reaction zone.

6. A method according to claim 5, which further comprises recirculating to said introduction zone a part or all of said polymer obtained at the bottom of said free-fall polymerization reaction zone, and allowing said recirculated polymer to pass downwardly through said perforated plate and fall freely through said free-fall polymerization reaction zone, thereby increasing the degree of polymerization of said recirculated polymer during the free-fall thereof to a predetermined level.

7. A method according to claim 5, wherein, in said free-fall polymerization of said second prepolymer, said introduction of the second prepolymer to said introduction zone having the perforated plate is continuously conducted, and which method further comprises continuously conducting a sequence of steps of recirculating to said introduction zone a part of the polymer obtained at the bottom of said free-fall polymerization reaction zone, and allowing an admixture of said continuously introduced second prepolymer in the molten state and the recirculated polymer to pass downwardly through said perforated plate and fall freely through said free-fall polymerization reaction zone, thereby continuously effecting a free-fall polymerization of said admixture during the free-fall thereof, while continuously withdrawing the remainder of said polymer obtained at the bottom of said free-fall polymerization reaction zone.

8. A method according to claim 4, wherein said molten prepolymer is a molten third prepolymer which has been obtained by a process comprising:

polymerizing a starting material in a molten state, while agitating, in an agitation type polymerizer vessel, said starting material being at least one member selected from the group consisting of:

a monomer mixture of an aromatic dihydroxy compound and a diaryl carbonate, and a first prepolymer obtained by reacting an aromatic dihydroxy compound with a diaryl carbonate, thereby effecting an agitation polymerization of said starting material to obtain a second prepolymer; and feeding said second prepolymer in a molten state to an upper portion of a wall extending through a wall-wetting fall polymerization reaction zone, and allowing said second prepolymer to fall along and in contact with the surface of said wall, thereby effecting a wall-wetting fall polymerization of said second prepolymer during the wall-wetting fall thereof; and wherein said molten third prepolymer is subjected to said free-fall polymerization to obtain said polymer at the bottom of said free-fall polymerization reaction zone.

9. A method according to claim 8, which further comprises recirculating to said introduction zone a part or all of said polymer obtained at the bottom of said free-fall polymerization reaction zone, and allowing said recirculated polymer to pass downwardly through said perforated plate and fall freely through said free-fall polymerization reaction zone, thereby increasing the degree of polymerization of said recirculated polymer during the free-fall thereof to a predetermined level.

10. A method according to claim 8, wherein, in said free-fall polymerization of said third prepolymer, said introduction of the third prepolymer to said introduction zone having the perforated plate is continuously conducted, and which method further comprises continuously conducting a sequence of steps of recirculating to said introduction zone a part of the polymer obtained at the bottom of said free-fall polymerization reaction zone, and allowing an admixture of said continuously introduced third prepolymer in the molten state and the recirculated polymer to pass downwardly through said perforated plate and fall freely through said free-fall polymerization reaction zone, thereby continuously effecting a free-fall polymerization of said admixture during the free-fall thereof, while continuously withdrawing the remainder of said polymer obtained at the bottom of said free-fall polymerization reaction zone.

11. A method according to any one of claims 1 to 9, wherein said free-fall is conducted through a distance of 0.3 m or more from said perforated plate.

* * * * *